United States Patent
Jeong et al.

(10) Patent No.: US 9,832,564 B2
(45) Date of Patent: Nov. 28, 2017

(54) MULTI-POLE EARPHONE PLUG AND ADJUSTABLE MULTI-POLE AUDIO CONNECTOR INCLUDING THE SAME

(71) Applicant: Samsung Electronics Co., Ltd., Gyeonggi-do (KR)

(72) Inventors: Sung-Hoon Jeong, Gyeonggi-do (KR); Juhee Chang, Gyeonggi-do (KR); Sangju Lee, Gyeonggi-do (KR); Cheol Yong Park, Gyeonggi-do (KR); Ho-Chul Hwang, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 0 days.

(21) Appl. No.: 15/053,482

(22) Filed: Feb. 25, 2016

(65) Prior Publication Data
US 2016/0254625 A1 Sep. 1, 2016

(30) Foreign Application Priority Data
Feb. 26, 2015 (KR) .................. 10-2015-0027505

(51) Int. Cl.
| | |
|---|---|
| H01R 24/58 | (2011.01) |
| H04R 1/10 | (2006.01) |
| G10K 11/178 | (2006.01) |
| H04R 27/00 | (2006.01) |
| H04M 1/02 | (2006.01) |

(52) U.S. Cl.
CPC ......... *H04R 1/1091* (2013.01); *G10K 11/178* (2013.01); *G10K 2210/1081* (2013.01); *H01R 24/58* (2013.01); *H04M 1/0268* (2013.01); *H04M 2250/12* (2013.01); *H04R 1/1033* (2013.01); *H04R 1/1083* (2013.01); *H04R 27/00* (2013.01); *H04R 2420/09* (2013.01)

(58) Field of Classification Search
CPC  H04R 1/1091; H04R 2107/00; H04R 1/1083; H01R 24/58; H01R 27/00; H01R 13/052; H04W 4/12; H04M 2250/12; H04M 1/0268; G10K 2210/1081; G10K 11/178
See application file for complete search history.

(56) References Cited

U.S. PATENT DOCUMENTS

| | | | | |
|---|---|---|---|---|
| 6,439,933 | B1 * | 8/2002 | Moji ...................... | H01R 24/58 439/668 |
| 6,461,199 | B1 * | 10/2002 | Koga .................... | H01R 24/58 439/668 |
| 6,945,803 | B2 * | 9/2005 | Potega .................... | G01K 1/02 374/E1.002 |

(Continued)

FOREIGN PATENT DOCUMENTS

GB  WO 2016009365 A1 * 1/2016 ............. H01R 35/04

*Primary Examiner* — Davetta W Goins
*Assistant Examiner* — Kuassi Ganmavo
(74) *Attorney, Agent, or Firm* — The Farrell Law Firm, P.C.

(57) ABSTRACT

A general-purpose audio connector is provided. The audio connector includes an earphone plug that includes a plurality of first terminals, and an earphone connector that includes a plurality of second terminals. The earphone plug is configured to be inserted into and to connect to the earphone connector. The number of poles of the plurality of first terminals that connect to the plurality of second terminals is variable depending on a movement of the earphone plug.

17 Claims, 34 Drawing Sheets

(56) References Cited

U.S. PATENT DOCUMENTS

| | | | |
|---|---|---|---|
| 7,601,032 B2 | 10/2009 | Labarca et al. | |
| 7,927,151 B2 * | 4/2011 | Prest | H01R 13/035 439/669 |
| 8,249,288 B2 | 8/2012 | Xu | |
| 8,556,664 B2 * | 10/2013 | Aase | H01R 24/58 439/668 |
| 8,597,061 B2 | 12/2013 | Liang et al. | |
| 8,801,472 B1 * | 8/2014 | Yen | H01R 13/703 439/668 |
| 2008/0226091 A1 * | 9/2008 | Matsumoto | H04R 1/1083 381/71.1 |
| 2009/0111336 A1 * | 4/2009 | Johansson | H01R 23/26 439/884 |
| 2012/0094521 A1 * | 4/2012 | Montena | H01R 13/639 439/345 |
| 2012/0128169 A1 * | 5/2012 | Tung | H01R 13/701 381/74 |
| 2012/0207318 A1 * | 8/2012 | Tsuchiya | H04R 3/00 381/71.6 |
| 2013/0078869 A1 * | 3/2013 | Golko | H01R 13/642 439/668 |
| 2014/0098969 A1 * | 4/2014 | Oliveira | H04R 1/1083 381/74 |
| 2014/0277643 A1 | 9/2014 | Villarreal et al. | |

* cited by examiner

MULTI-POLE EARPHONE PLUG AND ADJUSTABLE MULTI-POLE AUDIO CONNECTOR INCLUDING THE SAME

PRIORITY

This application claims priority under 35 U.S.C. §119(a) to Korean Patent Application Serial No. 10-2015-0027505, which was filed in the Korean Intellectual Property Office on Feb. 26, 2015, the entire content of which is incorporated herein by reference.

BACKGROUND

1. Field of the Disclosure

The present disclosure relates generally to an adjustable audio connector used to connect with an electronic device.

2. Description of the Related Art

In general, an earphone, a headphone, a speaker, or the like is used to connect to an electronic device, such as a compact sound device, a mobile communication terminal, or a personal multimedia device, in a wired or wireless manner, to listen to a sound signal that is generated and output by the electronic device.

In particular, an earphone is applied to various portable sound devices because the earphone is small and convenient to carry. A user listens to a sound signal of a portable sound device by inserting a plug, which is provided in the earphone, into an earphone jack that is provided in the portable sound device.

In an electronic device, an audio plug (or a connecting terminal, such as an earphone plug) is configured to have a pin with 3 poles, 4 poles, 5 poles or 6 poles. A 3-pole audio plug supports a listening to music function and a reception function while talking on a phone, and a 4-pole audio plug supports a recording function and a transmission function in addition to the listening to music and the reception function. In the case of a 5-pole earphone, a microphone (mic) unit of the fourth pole is divided into a left (L) pole and a right (R) pole so that the 5-pole earphone supports an input/output by a total of five poles. A 6-pole audio plug supports an Active Noise Cancellation (ANC) microphone input, including the above-mentioned functions.

The earphone jack, i.e., connector, includes connecting terminals that correspond to the terminals of the plug, respectively. When the plug is inserted into the earphone jack, an arch-shaped contact plate comes in contact with the connecting terminals to form an electrical connection.

Recently, as the ANC function has been added to earphones and headphones, in addition to the listening to music function and the phone call function, an increase in the number of connecting pins is unavoidable.

However, when the number of pins increases in an existing audio plug, the external appearance of the audio plug is physically changed so that the audio plug is only applicable to a dedicated electronic device that supports a plug with a corresponding number of poles.

That is, the existing plug suffers from a compatibility restriction. For example, a 3.5 pin 6-pole earphone plug has been developed by adding two poles in order to add the ANC function to a 3.5 pin 4-pole earphone plug. However, the 3.5 pin 6-pole earphone plug is not applicable to an ordinary music player that only supports 3 poles or 4 poles. Thus, a basic listening to music function as well as the ANC function are disabled.

SUMMARY

The present disclosure has been made to address at least the problems and disadvantages described above, and to provide at least the advantages described below. Accordingly, an aspect of the present disclosure provides an adjustable multi-pole audio connector that is inserted into an ordinary audio connector to be normally operated while one or more functions are added, and is compatible to various audio connectors, to match a situation regardless of change of the number and polarities of poles of the multi-pole audio connector.

According to an aspect of the present disclosure, an audio connector is provided that includes an earphone plug that includes a plurality of first terminals and an earphone connector that includes a plurality of second terminals. The earphone plug is configured to be inserted into the earphone connector to connect to the earphone connector. A number of poles of the plurality of first terminals that connect to the plurality of second terminals is variable depending on a movement of the earphone plug.

According to another aspect of the present disclosure, an earphone plug is provided that includes a connecting portion that includes a plurality of terminals that are arranged in a stacked form along a longitudinal direction thereof. The connecting portion is divided by at least one insulator, and the insulator extends along an outer peripheral surface of the connecting portion in the longitudinal direction, to divide a connecting region of the plurality of terminals.

According to another aspect of the present disclosure, an earphone plug is provided that includes a connecting portion that includes a plurality of terminals that are arranged in a stacked form along a longitudinal direction thereof and a body that supports the terminals. The connecting portion is configured to be movable in the body in the longitudinal direction to adjust a number of terminal poles that protrude outside the body.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
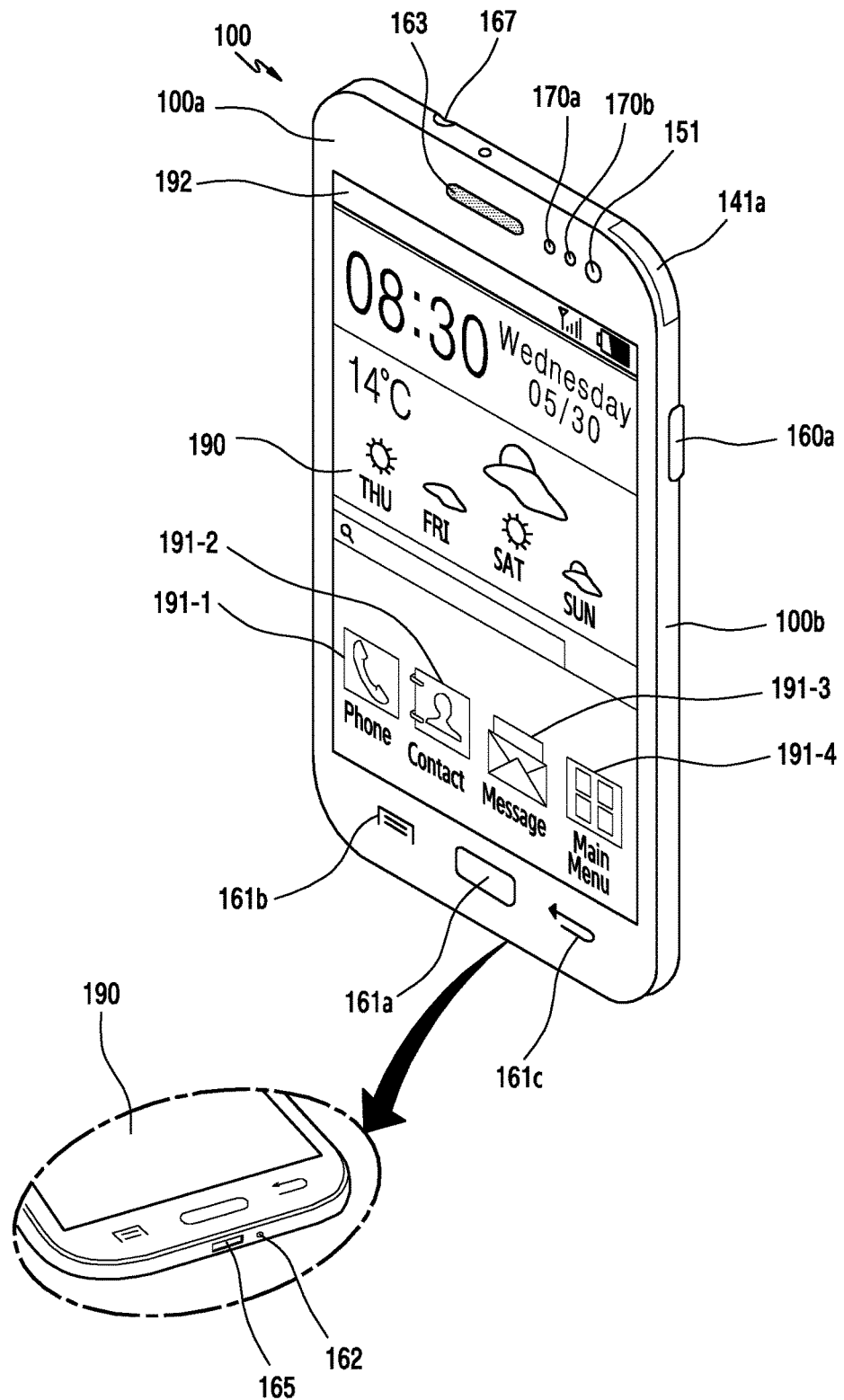
FIG. 1 is a perspective view of a front side of an electronic device according to an embodiment of the present disclosure.

Hereinafter, embodiments of the present disclosure will be explained with reference to the accompanying drawings. Although specific embodiments of the present disclosure are illustrated in the drawings and relevant detailed descriptions are provided, various changes can be made and various embodiments may be provided. Accordingly, embodiments of the present disclosure are not limited to the specific embodiments and should be construed as including all changes and/or equivalents or substitutes, as recognized by one of ordinary skill in the art, according to the embodiments of the present disclosure. In the explanation of the drawings, similar reference numerals are used for similar elements.

The terms "include" or "may include" used in the embodiments of the present disclosure indicate the presence of corresponding functions, operations, elements, and the like, and do not limit additional one or more functions, operations, elements, and the like. In addition, it should be understood that the terms "include" or "have" used in the present disclosure indicate the presence of features, numbers, steps, operations, elements, parts, or a combination thereof described in the specifications, and do not preclude the presence or addition of one or more other features, numbers, steps, operations, elements, parts, or a combination thereof.

The term "or" used in the embodiments of the present disclosure include any and all combinations of words enumerated with the term. For example, "A or B" means including A, including B, or including both A and B.

Terms including an ordinal number such as first, second, etc. can be used to describe various elements of the various embodiments, without limiting the corresponding elements. For example, these terms do not limit an order and/or importance of the corresponding elements, but are used merely to distinguish one element from another element. For example, a first electronic device and a second electronic device each indicate electronic devices and may indicate different electronic devices. For example, a first element may be referred to as a second element without departing from the scope of the various embodiments, and similarly, a second element may be referred to as a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in describing the various embodiments of the present disclosure are for the purpose of describing specific embodiments only and are not intended to limit various embodiments of the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the various embodiments.

An electronic device according to various embodiments of the present disclosure may be a device that is equipped with a communication function. For example, the electronic device may include at least one of a smartphone, a tablet personal computer (PC), a mobile phone, a video phone, an electronic book reader, a desktop PC, a laptop PC, a netbook computer, a Personal Digital Assistant (PDA), a Portable Multimedia Player (PMP), an MP3 player, a mobile medical machine, a camera, or a wearable device (for example, a head-mounted-device (HMD) such as electronic glasses, electronic clothing, an electronic bracelet, an electronic necklace, an electronic appcessory, electronic tattoos, or a smart watch).

The electronic device according to various embodiments of the present disclosure may be one or a combination of one or more of the above-mentioned devices. In addition, the electronic device according to various embodiments of the present disclosure may be a flexible device. In addition, as would be recognized by one of ordinary skill in the related art, the electronic device according to various embodiments of the present disclosure is not limited to the above-mentioned devices.

Hereinafter, descriptions will be made based on an electronic device according to various embodiments with reference to the accompanying drawings. As used herein, the term "user" indicates a person who uses an electronic device or a device (e.g., an artificial intelligence electronic device) that uses an electronic device.

Figure 2:
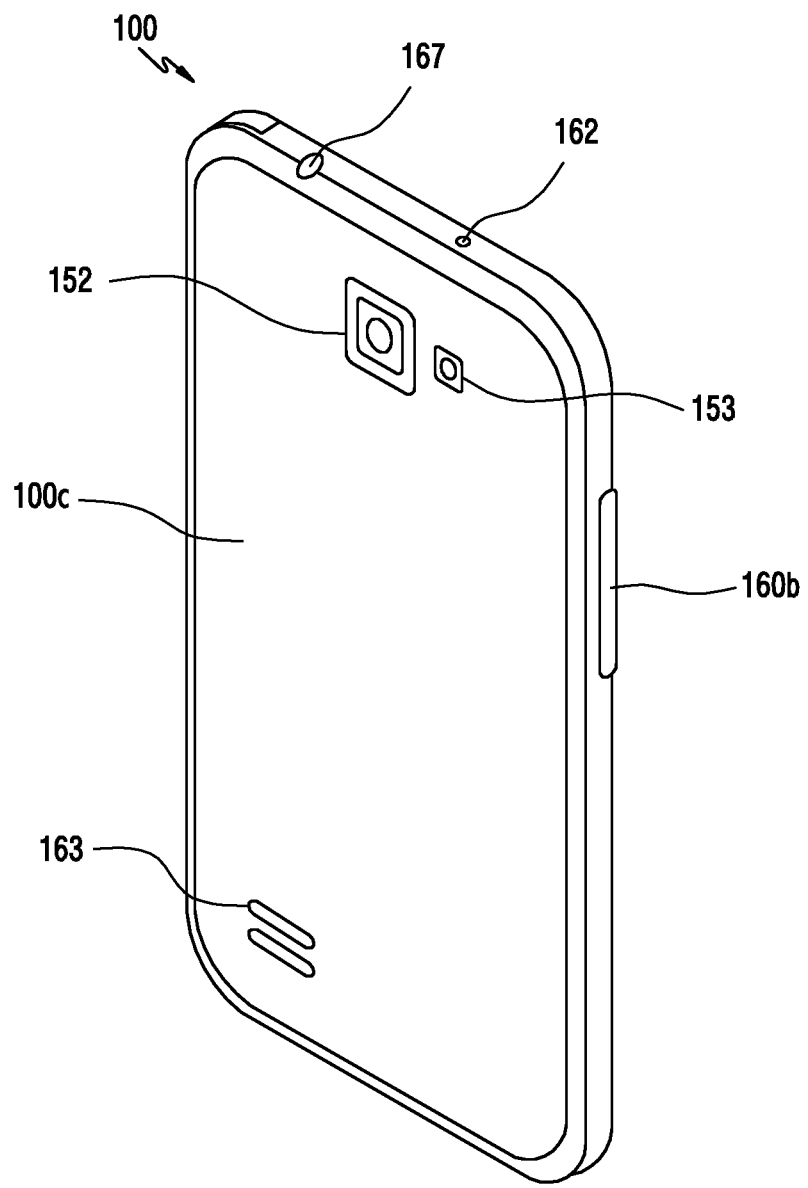
FIG. 2 is a perspective view of a rear side of the electronic device according to an embodiment of the present disclosure.

FIG. 1 is a perspective view of a front side of an electronic device according to an embodiment of the present disclosure. FIG. 2 is a perspective view of a rear side of the electronic device according to an embodiment of the present disclosure.

Referring to FIGS. 1 and 2, a touch screen 190 is centrally arranged on a front face 100a of an electronic device 100. The touch screen 190 is formed in a large size to occupy a majority of the front face 100a of the electronic device 100. FIG. 1 illustrates an example in which a main home screen is displayed on the touch screen 190. The main home screen refers to a first screen that is displayed on the touch screen 190 when the power of the electronic device 100 is turned on. In addition, when the electronic device 100 has several pages of different home screens, the main home screen may be the first home screen among the several pages of different home screens. The home screen may display shortcut icons 191-1, 191-2, and 191-3 to execute frequently used applications, a main menu switching key 191-4, time, weather, or the like. The main menu switching key 191-4 may cause the main screen to be displayed on the touch screen 190. In addition, in the upper end of the touch screen 190, status bars 192 may be formed to indicate the statuses of the electronic device 100, such as a battery charge status, a received signal strength, and the current time. Below the touch screen 190, a home button 161a, a menu button 161b, and a back button 161c may be formed.

The home button 161a causes the main home screen to be displayed on the touch screen 190. For example, when the home button 161a is touched in the state where a home screen, which is different from the main home screen, or the menu screen is displayed on the touch screen 190, the main home screen may be displayed on the touch screen 190. In addition, when the home button 161a is touched while applications are executed on the touch screen 190, the main home screen illustrated in FIG. 2 may be displayed on the touch screen 190. In addition, the home button 161a may be used in order to cause the touch screen 190 to display the most recently used application or a task manager.

The menu button 161b provides a connection menu that may be used on the touch screen 190. The connection menu may include a widget addition menu, a background screen change menu, a retrieve menu, an edit menu, an environment setting menu, or the like. The back button 161c may cause the screen, which was executed just prior to the currently executed screen, to be displayed, or may cause the most recently used application to be terminated.

A first camera 151, an illuminance sensor 170a, a proximity sensor 170b, and a speaker 163 may be arranged in an edge of the front face 100a of the electronic device 100. A second camera 152 and a flash 153 may be arranged on the rear face 100c of the electronic device 100.

For example, a power/reset button 160a, a volume button 160b, a terrestrial DMB antenna 141a for broadcasting reception, one or more mics 162, or the like may be arranged on the side faces 100b of the electronic device 100. The DMB antenna 141a may be fixed to the electronic device 100, or may be constructed so as to be removable from the electronic device 100.

In addition, a connector 165 is formed on the lower end side face of the electronic device 100. The connector 165 is formed with a plurality of electrodes, and may be connected to an external device via a wire. An earphone connecting jack 167 may be arranged on the upper end side face of the electronic device 100. An earphone may be inserted into the earphone connecting jack 167. The earphone connecting jack 167 may be alternatively or additionally arranged on the lower end side face of the electronic device 100.

Figure 3:
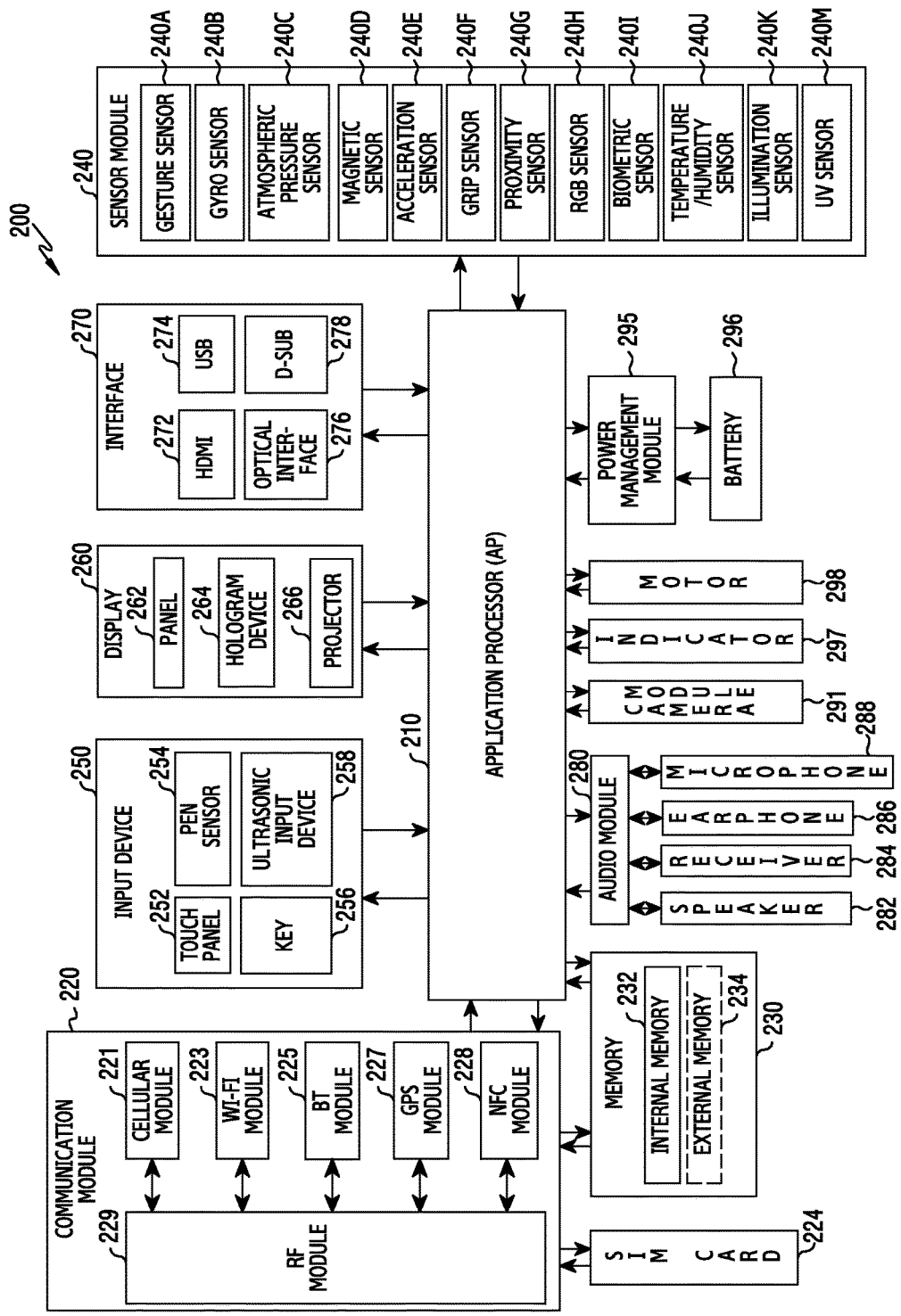
FIG. 3 is a block diagram of an electronic device according to an embodiment of the present disclosure.

FIG. 3 is a block diagram of an electronic device 200 according to an embodiment of the present disclosure. The electronic device 200 may correspond to the entirety or part of the electronic device 100 shown in FIG. 1. Referring to FIG. 2, the electronic device 200 may include one or more Application Processors (APs) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, or a motor 298.

The AP 210 controls a plurality of hardware or software elements connected to the AP 210 by driving an operating system or an application program, and processes and calculates a variety of data including multimedia data. For example, the AP 210 may be implemented by using a System on Chip (SoC). The AP 210 may include a Graphic Processing Unit (GPU).

The communication module 220 transmits and receives data via communication between the electronic device 200 (for example, the electronic device 100) and other electronic devices (for example, another electronic device or a server) connected through a network. The communication module 220 may include a cellular module 221, a Wireless Fidelity (WiFi) module 223, a Bluetooth® (BT) module 225, a Global Positioning System (GPS) module 227, an Near Field Communication (NFC) module 228, and a Radio Frequency (RF) module 229.

The cellular module 221 provides a voice call, a video call, a text service, or an Internet service through a telecommunications network (for example, a Long Term Evolution (LTE) network, an LTE Advanced (LTE-A) network, a Code Division Multiple Access (CDMA) network, a Wideband CDMA (WCDMA) network, a Universal Mobile Telecommunications System (UMTS), a Wireless Broadband (Wi-Bro) network, a Global System for Mobile Communication (GSM) network, and the like). In addition, the cellular module 221 identifies and authenticates the electronic device in the telecommunications network by using a subscriber identification module (for example, the SIM card 224). The cellular module 221 performs at least some of the functions provided by the AP 210. For example, the cellular module 221 may perform at least some of the multimedia control functions.

The cellular module 221 may include a Communication Processor (CP). In addition, the cellular module 221 may be implemented by using an SoC, for example. In FIG. 2, the cellular module 221 (for example, the communication processor), the memory 230, or the power management module 295 are elements separate from the AP 210. However, according to an embodiment, the AP 210 may be configured to include at least some of the above-described elements (for example, the cellular module 221).

The AP 210 or the cellular module 221 (for example, the communication processor) may load instructions or data received from a non-volatile memory connected therewith or at least one of the other elements into a volatile memory, and may process the instructions or data. In addition, the AP 210 or the cellular module 221 may store data which is received from at least one of the other elements or generated by at least one of the other elements in the non-volatile memory.

The WiFi module 223, the BT module 225, the GPS module 227, or the NFC module 228 each may include a processor for processing data received and transmitted through a corresponding module. In FIG. 3, the cellular module 221, the WiFi module 223, the BT module 225, the GPS module 227, or the NFC module 228 is illustrated in a separate block. However, at least some (for example, two or more) of the cellular module 221, the WiFi module 223, the BT module 225, the GPS module 227, or the NFC module 228 may be included in a single integrated chip (IC) or a single IC package. For example, at least some of the processors corresponding to the cellular module 221, the WiFi module 223, the BT module 225, the GPS module 227, and the NFC module 228 (for example, the communication processor corresponding to the cellular module 221 and the WiFi processor corresponding to the WiFi module 223) may be implemented by using a single SoC.

The RF module 229 transmits and receives data, for example, transmits and receives an RF signal. The RF module 229 may include a transceiver, a Power Amp Module (PAM), a frequency filter, or a Low Noise Amplifier (LNA), for example. In addition, the RF module 229 may further include a component for exchanging electromagnetic waves in a free space in wireless communication, for example, a conductor or conducting wire. In FIG. 3, the cellular module 221, the WiFi module 223, the BT module 225, the GPS module 227, and the NFC module 228 share the single RF module 229 with one another. However, at least one of the cellular module 221, the WiFi module 223, the BT module 225, the GPS module 227, or the NFC module 228 may transmit and receive an RF signal through a separate RF module.

The SIM card 224 can include a subscriber identification module, and can be inserted into a slot formed on a specific location of the electronic device. The SIM card 224 may include unique identification information (for example, an Integrated Circuit Card Identifier (ICCID)) or subscriber information (for example, International Mobile Subscriber Identity (IMSI)).

The memory 230 may include an internal memory 232 or an external memory 234. For example, the internal memory 232 may include at least one of a volatile memory (for example, a Dynamic Random Access Memory (DRAM), a Static Random Access Memory (SRAM), a Synchronous DRAM (SDRAM), and the like) and a non-volatile memory (for example, an One-Time Programmable Read Only Memory (OTPROM), a Programmable Read Only Memory (PROM), an Erasable Programmable Read Only Memory (EPROM), an Electrically Erasable Programmable Read Only Memory (EEPROM), a mask ROM, a flash ROM, a NAND flash memory, a NOR flash memory, and the like).

The internal memory 232 may be a Solid State Drive (SSD). The external memory 234 may further include a flash drive, for example, Compact Flash (CF), Secure Digital (SD), Micro-SD, Mini-SD, extreme-Digital (xD), a memory stick, and the like. The external memory 234 may be functionally connected with the electronic device 200 through various interfaces. According to an embodiment, the electronic device 200 may further include a storage device (or a storage medium) such as a hard drive.

The sensor module 240 measures a physical quantity or detect an operation state of the electronic device 200, and converts measured or detected information into electric signals. The sensor module 240 includes at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., Red, Green, Blue (RGB) sensor), a biosensor 240I, a temperature/humidity sensor 240J, an illumination sensor 240K, and a Ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared ray (IR) sensor, an iris sensor, a fingerprint sensor, and the like. The sensor module 240 may further include a control circuit to control at least one sensor included therein.

The input device 250 includes a touch panel 252, a (digital) pen sensor 254, a key 256, or an ultrasonic input device 258. The touch panel 252 recognizes a touch input in at least one method of capacitive, resistive, infrared, and ultrasonic methods. In addition, the touch panel 252 may further include a control circuit. In the embodiment of a capacitive method, the touch panel 252 may recognize physical contact or hovering. The touch panel 252 may further include a tactile layer. In this embodiment, the touch panel 252 may provide a tactile response to the user.

The (digital) pen sensor 254 may be implemented in the same or similar method as or to the method of receiving a user's touch input or by using a separate detection sheet. The key 256 may include a physical button, an optical key, or a keypad. The ultrasonic input device 258 allows the electronic device 200 to detect sound waves through a microphone 288 through an input tool generating ultrasonic signals and identify data, and is capable of wireless recognition. According to an embodiment, the electronic device 200 may receive a user input from an external device connected thereto (for example, a computer or a server) using the communication module 220.

The display 260 includes a panel 262, a hologram device 264, or a projector 266. For example, the panel 262 may be a Liquid Crystal Display (LCD) or an Active Matrix Organic Light Emitting Diode (AM-OLED). For example, the panel 262 may be implemented to be flexible, transparent, or wearable. The panel 262 may be configured as a single module along with the touch panel 252. The hologram device 264 may show a stereoscopic image in the air using interference of light. The projector 266 displays an image by projecting light onto a screen. The screen may be located inside or outside the electronic device 200. According to an embodiment, the display 260 may further include a control circuit to control the panel 262, the hologram device 264, or the projector 266.

The interface 270 may include a High Definition Multimedia Interface (HDMI) 272, a Universal Serial Bus (USB) 274, an optical interface 276, or D-subminiature (sub) 278. The interface 270 may be included in the communication module 220. Additionally or alternatively, the interface 270 may include a Mobile High Definition Link (MHL) interface, a Secure Digital (SD)/Multimedia Card (MMC) interface or Infrared Data Association (IrDA) standard interface.

The audio module 280 converts a sound and an electric signal bidirectionally. The audio module 280 processes sound information which is input or output through a speaker 282, a receiver 284, an earphone 286, or the microphone 288.

The camera module 291 is a device for photographing a still image and a moving image, and, according to an embodiment, the camera module 291 may include one or more image sensors (for example, a front surface sensor or a rear surface sensor), a lens, an Image Signal Processor (ISP), or a flash (memory) (for example, a Light Emitting Diode (LED) or a xenon lamp).

The power management module 295 manages power of the electronic device 200. The power management module 295 may include a Power Management IC (PMIC), a charger IC, or a battery or battery gauge.

For example, the PMIC may be mounted in an integrated circuit or an SoC semiconductor. The charging method may be divided into a wire charging method and a wireless charging method. The charger IC may charge a battery and may prevent inflow of overvoltage or over current from a charger. The charger IC may include a charger IC for at least one of the wire charging method and the wireless charging method. The wireless charging method may include a magnetic resonance method, a magnetic induction method, or an electromagnetic wave method, and an additional circuit for charging wirelessly, for example, a circuit such as a coil loop, a resonant circuit, a rectifier, and the like may be added.

For example, the battery gauge measures a remaining life of the battery 296, a voltage, a current, or temperature during charging. The battery 296 stores and supplies electric power to the electronic device 200. The battery 296 may include a rechargeable battery or a solar battery.

The indicator 297 may display a specific state of the electronic device 200 or a part of it (for example, the AP 210), for example, a booting state, a message state, or a charging state. The motor 298 converts an electric signal into a mechanical motion or vibration. The electronic device 200 includes a processing device (for example, a GPU) for supporting a mobile TV. The processing device for supporting the mobile TV may process media data according to standards such as Digital Multimedia Broadcasting (DMB), Digital Video Broadcasting (DVB), or media flow.

Each of the above-described elements of the electronic device according to various embodiments of the present disclosure may be comprised of one or more components, and the names of the elements may vary according to the kind of the electronic device. The electronic device may include at least one of the above-described elements, and some of the elements may be omitted or an additional element may be further included. In addition, some of the elements of the electronic device may be combined into a single entity, and may perform the same functions as those of the elements before being combined.

Hereinafter, descriptions will be made on a configuration of an audio connector, i.e., a module, with reference to the accompanying drawings.

Figure 4:
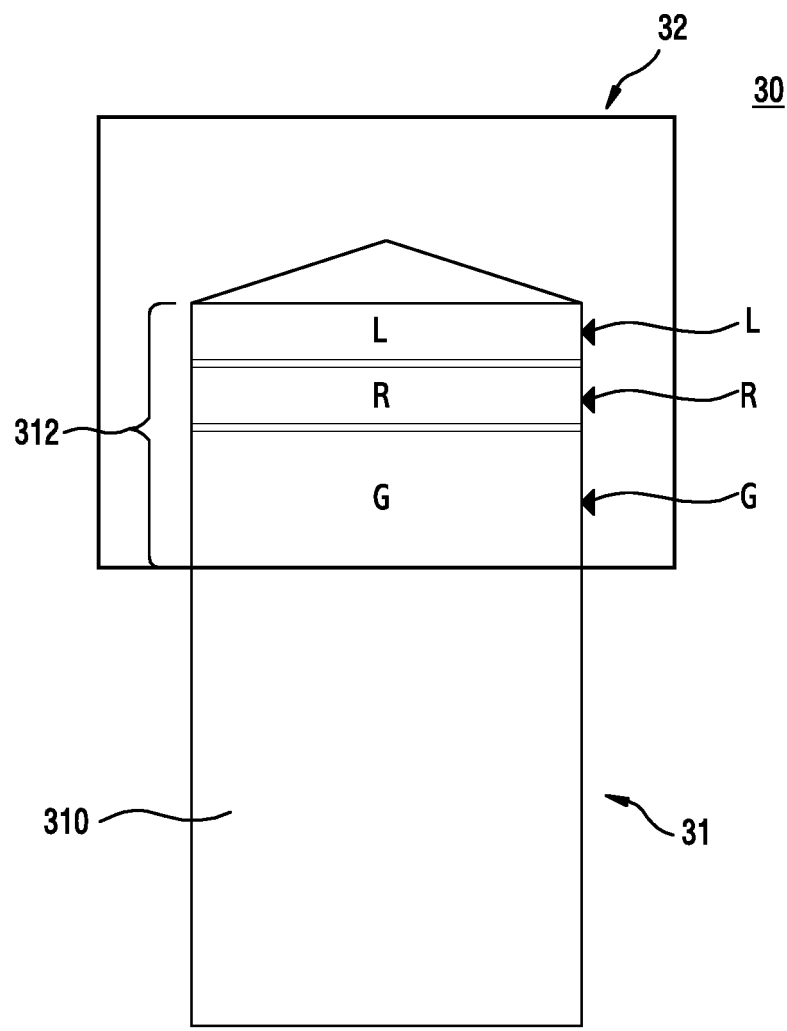
FIG. 4 illustrates a 3-pole audio connector according to an embodiment of the present disclosure.

FIG. 4 illustrates a 3-pole audio connector 30 according to an embodiment of the present disclosure.

Referring to FIG. 4, the 3-pole audio connector 30 includes an earphone plug 31 and an earphone connector 32. The earphone plug 31 is a substantially cylindrical male connector, and the earphone connector 32 is a female connector. The earphone plug 31 is inserted into the earphone connector 32 such that the earphone plug 31 and the earphone connector 32 are in a connected state, and the connected state may be maintained. When an earphone plug 31 is connected to the earphone connector 32 by a user, a listening to music function and a reception function are supported when talking on a phone.

The earphone plug 31 includes a connecting portion 312 that includes a plurality of terminals and a body 310 that is made of an insulating material. The terminals include a left speaker terminal L, a right speaker terminal R, and a ground terminal G. The earphone connector 32 includes a left speaker terminal L, a right speaker terminal R, and a ground terminal G that correspond to the terminals that are provided in the earphone plug 31, respectively. The terminals are arranged in a stacked form along a longitudinal direction, and the terminals are separated from each other by an insulating material that is interposed therebetween.

Figure 5:
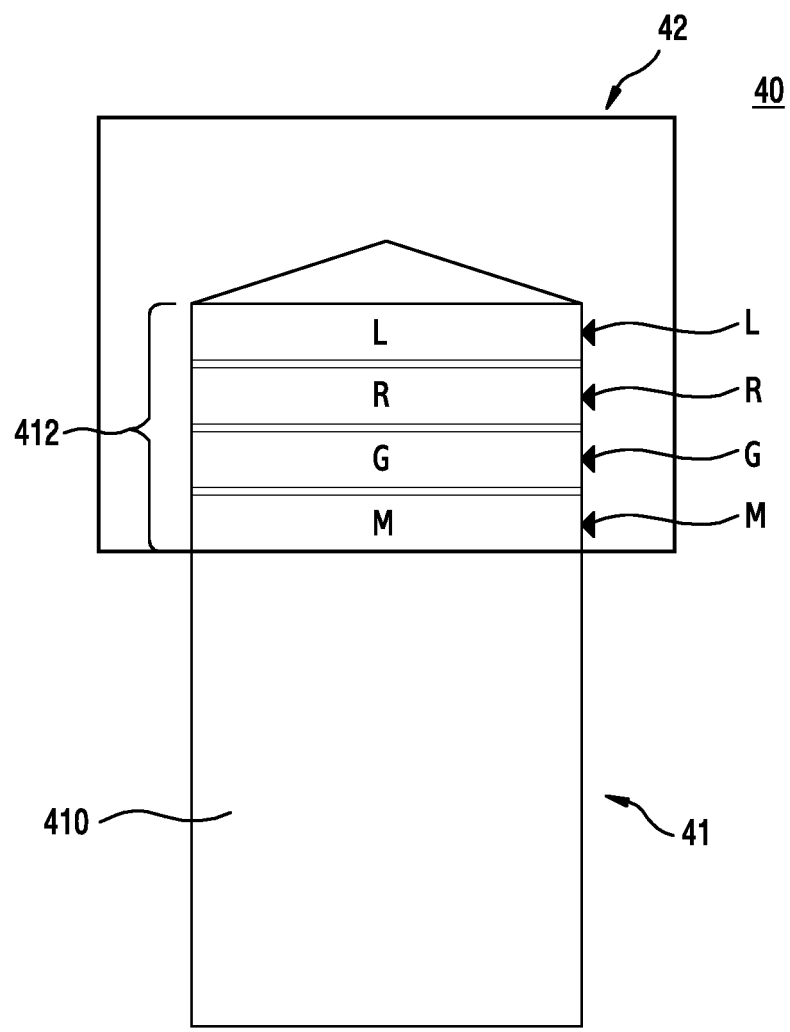
FIG. 5 illustrates a 4-pole audio connector according to an embodiment of the present disclosure.

FIG. 5 illustrates a 4-pole audio connector 40 according to an embodiment of the present disclosure.

Referring to FIG. 5, the 4-pole audio connector 40 includes an earphone plug 41 and an earphone connector 42. The earphone plug 41 is a substantially cylindrical male connector, and the earphone connector 42 is a female connector. The earphone plug 41 is inserted into the earphone connector 42 such that the earphone plug 41 and the earphone connector 42 are in a connected state, and the connected state is maintained. When the earphone plug 41 is connected to the earphone connector 42 by the user, a recording function or a transmission function is supported, in addition to the listening to music function and the reception function.

The earphone plug 41 includes a connecting portion 412 that includes a plurality of terminals and a body 410 that is made of an insulating material. The terminals include a left speaker terminal L, a right speaker terminal R, a ground terminal G, and a mic terminal M. The earphone connector 42 includes a left speaker terminal L, a right speaker terminal R, a ground terminal G, and a mic terminal M that correspond to the terminals provided in the earphone plug 41, respectively. The terminals are arranged in a stacked form along a longitudinal direction, and the terminals are separated from each other by an insulating material that is interposed therebetween.

Figure 6:
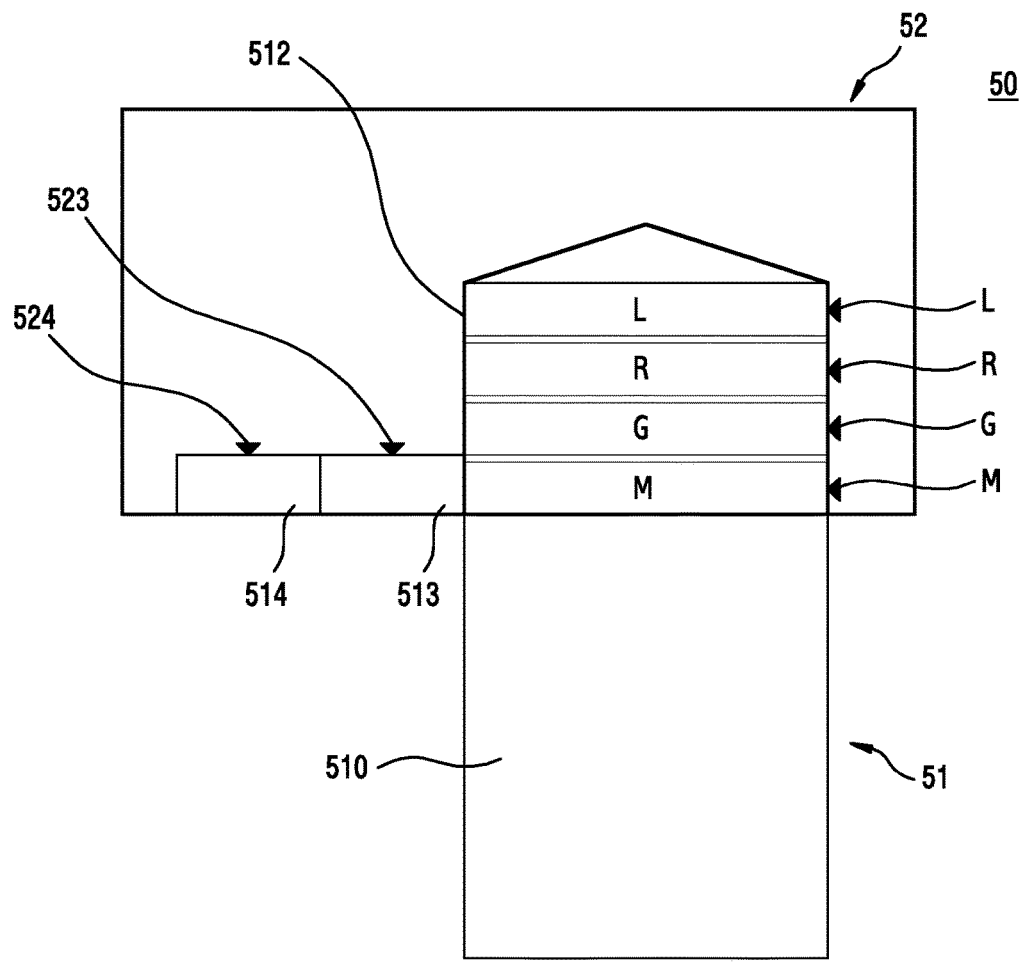
FIG. 6 illustrates a 6-pole audio connector according to an embodiment of the present disclosure.

FIG. 6 illustrates a 6-pole audio connector 50 according to an embodiment of the present disclosure.

Referring to FIG. 6, the 6-pole audio connector 50 includes an earphone plug 51 and an earphone connector 52. The earphone plug 51 is a substantially cylindrical male connector, and the earphone connector 52 is a female connector. The earphone plug 51 is inserted into the earphone connector 52 such that the earphone plug 51 and the earphone connector 52 are in a connected state, and the connected state may be maintained. When an earphone plug 51 is connected to the earphone connector 52 by the user, a recording function, a transmission function, or an ANC function is supported, in addition to the function of listening to music and the reception function.

The earphone plug 51 includes a connecting portion 512 that includes a plurality of terminals and a body 510 that is made of an insulating material. The terminals include a left speaker terminal L, a right speaker terminal R, a ground terminal G, a mic terminal M, a left ANC mic terminal 513, and a right ANC mic terminal 514. The earphone connector 52 includes a left speaker terminal L, a right speaker terminal, a ground terminal G, a left mic terminal 523, a right mic terminal M, a left ANC mic terminal 523, and a right ANC mic terminal 524 that correspond to the terminals that are provided in the earphone plug 51, respectively. As shown in FIG. 6, left and right mic terminals 523 and 524 are installed at a side of the mic terminal M.

However, adding the ANC function to an earphone and a headphone, in addition to the listening to music function and the phone call function, increases the number of pins. When the number of pins increases in an existing audio plug, the external appearance of the audio plug is physically changed so that the audio plug is only applicable to a dedicated electronic device that supports the plug, and a compatibility restriction arises.

For example, a 3.5 pin 6-pole earphone plug has been developed by adding two poles in order to add the ANC function to a 3.5 pin 4-pole earphone plug. However, the 3.5 pin 6-pole earphone plug is not applicable to an ordinary music player that only supports 3 poles or 4 poles. Thus, a basic listening to music function and the ANC function are disabled.

Figure 7:
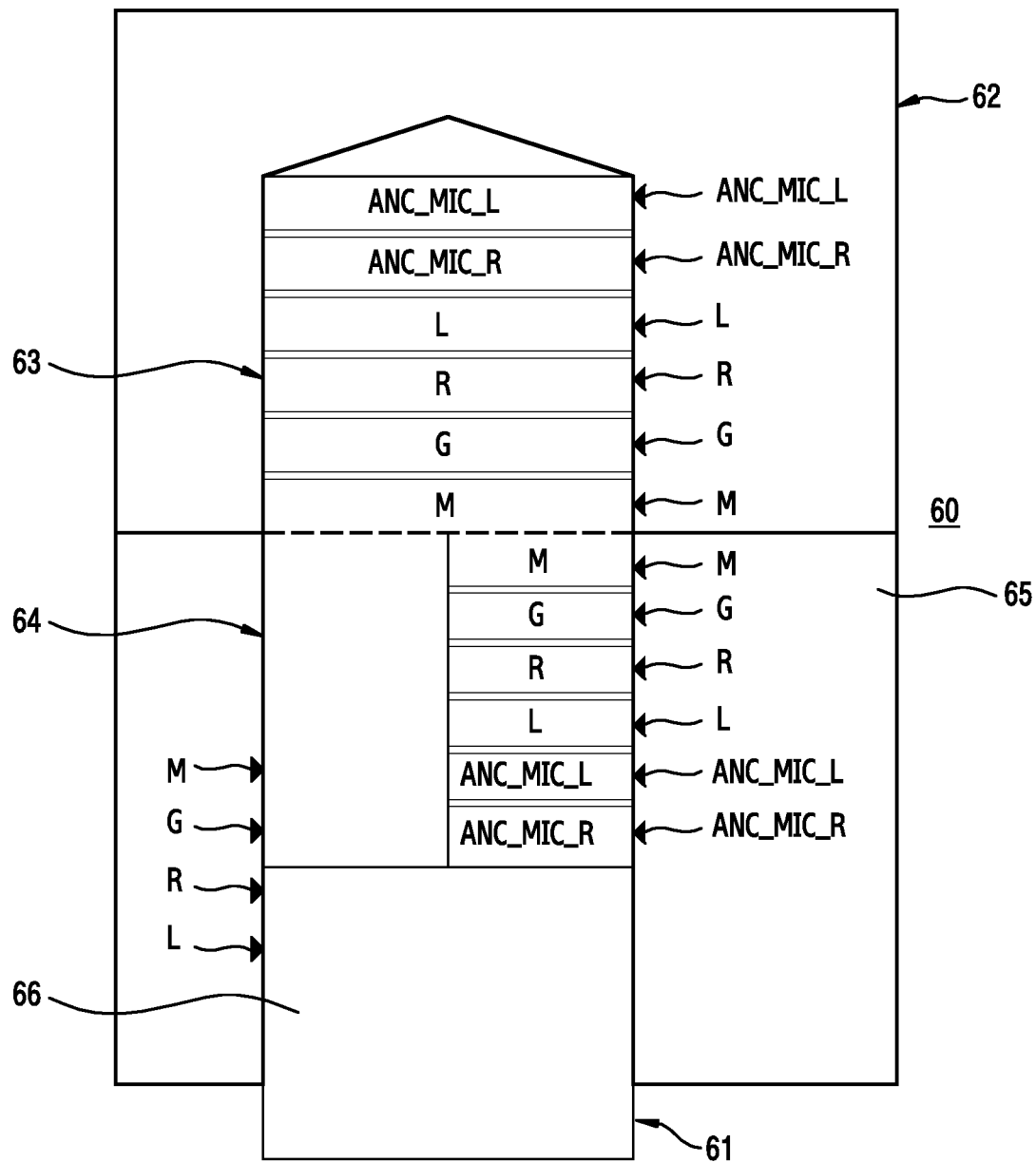
FIG. 7 illustrates a 6-pole audio connector according to an embodiment of the present disclosure.
Figure 8:
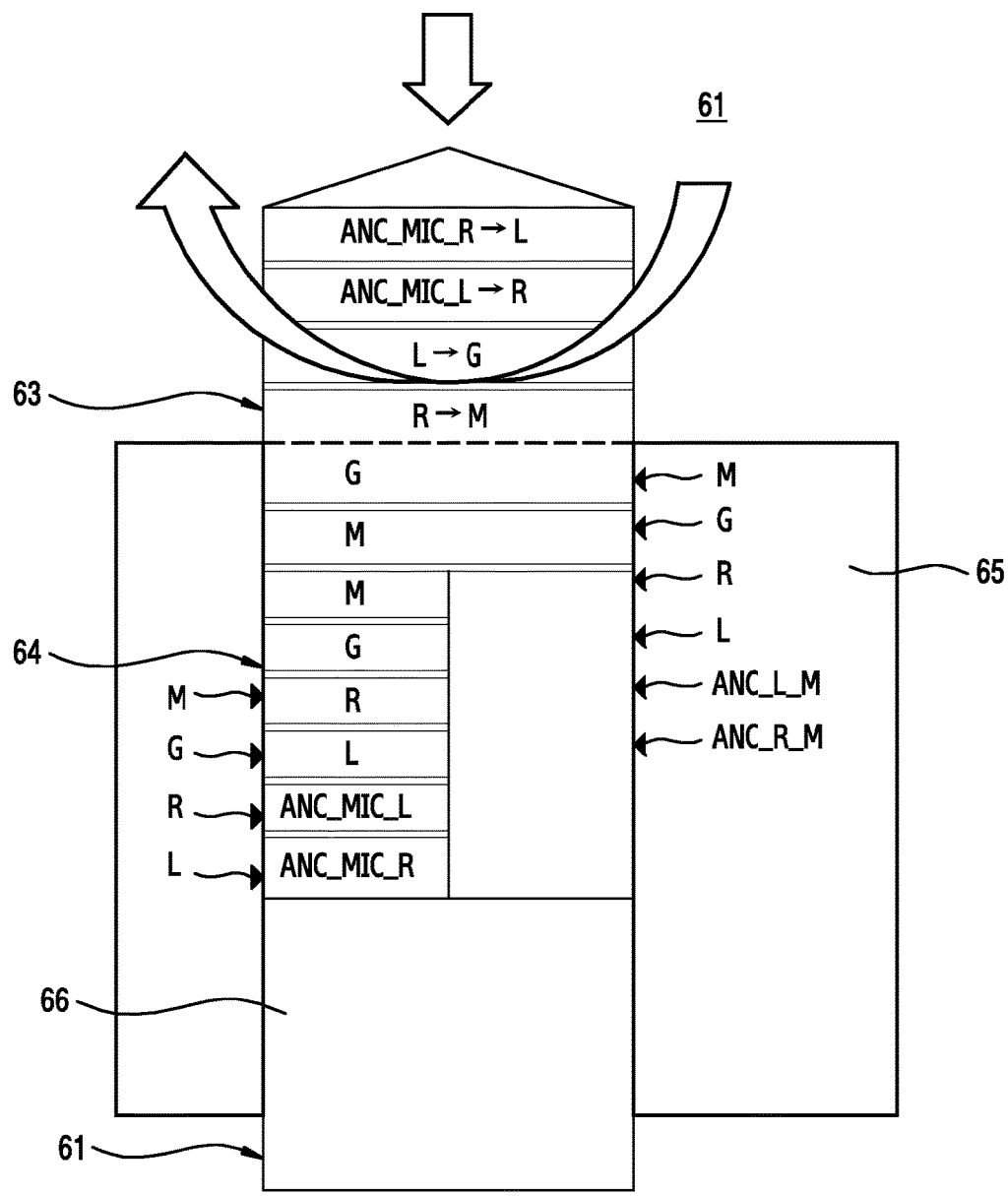
FIG. 8 illustrates a state in which a 6-pole contact audio connector is converted into a 4-pole audio connector according to an embodiment of the present disclosure.

FIG. 7 illustrates a 6-pole audio connector 60 according to an embodiment of the present disclosure. FIG. 8 illustrates a state in which a 6 contact audio connector 60 is converted into a 4-pole audio connector according to an embodiment of the present disclosure.

Referring to FIGS. 7 and 8, the audio connector 60 is a compatible audio connector, and is variable to allow for use of either a 4-pole audio connector or a 6-pole audio connector. Further, the audio connector may be a connector that is capable of also being used for an existing ear jack connector.

The audio connector 60 is configured to accommodate a variably adjustable earphone plug 61, and includes an earphone connector 62 that corresponds to and also accommodates the earphone plug 61. The earphone plug 61 is inserted into and connected to the earphone connector 62. The earphone plug 61 includes one or more connecting portions 63 and 64 and one or more bodies 65 and 66. The connecting portions 63 and 64 have a substantially cylindrical shape, and include a plurality of first and second terminals.

The earphone plug 61 is configured to protrude out from or retract into the body 65, along the longitudinal direction. In addition, the connecting portions of the earphone plug 61 include a plurality of rotation dependent terminals, and a plurality of non-rotation dependent terminals on the bodies. The earphone plug 61 includes a plurality of first terminals that are arranged on the non-rotation dependent connecting portion 63 and a plurality of second terminals that are arranged on the rotation dependent connecting portion 64. As described below, operation of the rotation dependent connecting portion 64 varies with rotation of earphone plug 61 relative to the earphone connector 62, and operation of connecting portion 63 does not vary with rotation of earphone plug 61 relative to the earphone connector 62. The connecting portions 64 and 63 retract into or protrude out from the body 65 in unison in the longitudinal direction.

As described above, the non-rotation dependent connecting portion 63 includes a plurality of terminals. In particular, the non-rotation dependent connecting portion 63 includes a left speaker terminal L, a right speaker terminal R, a ground terminal G, and mic terminal M, and may additionally include a left ANC mic terminal ANC_MIC L, and a right ANC mic terminal ANC_MIC_R. As shown in FIGS. 7 and 8, the left ANC mic terminal ANC_MIC_L and the right ANC mic terminal ANC_MIC_R are arranged at an uppermost end thereof. The left ANC mic terminal ANC_MIC_L and the right ANC mic terminal ANC_MIC_R are arranged separate from and outside the existing four speaker terminals (i.e., the left speaker terminal L, the right speaker terminal R, the ground terminal G, and the mic terminal M). The order in which the left ANC mic terminal ANC_MIC_L and the right ANC mic terminal ANC_MIC_R are arranged can vary, as would be recognized by one of ordinary skill in the art, based on the present disclosure.

As shown in FIG. 7, the earphone 61 includes a first body 65 and a second body 66 that accommodate movement of earphone plug 61 along a longitudinal direction from the first body 65, and rotation about central axis of the longitudinal direction, as shown in FIG. 8. The second body 66 is formed as a single body with the rotation dependent connecting portion 64 or may be connected to the rotation dependent connecting portion 64. The first body 65 supports the movement of the second body 66, and functions as a housing that protects the rotation dependent connecting portion 64. In addition, the first body 65 serves as another earphone connector. The first body 65 forms a hollow, and the second body 66 is cylindrical in shape, to fit within the hollow.

The rotation dependent connecting portion 64 is provided with a plurality of terminals, which are arranged to be concealed when the terminals are accommodated in the first body 65 of the rotation dependent connection portion 64. As shown in FIG. 7, the terminals are arranged on the rotation dependent connecting portion 64 in the order of the mic terminal M, the ground terminal G, the right speaker terminal R, the left speaker terminal L, the left mic terminal ANC_MIC_L, and the right ANC mic terminal ANC_MIC_R, with the mic terminal M closest to the uppermost end thereof.

The rotation dependent connecting portion 64 has a cylindrical exterior, and the connecting terminals are arranged on approximately one half of a circumference of the exterior. In other words, the connecting terminals are only arranged on approximately one half of the outer peripheral surface (shown in FIG. 7 as the right outer peripheral surface area) of the rotation dependent connecting portion 64.

The earphone connector 62 is a female connector, into which the earphone plug 61 is inserted, and includes a plurality of terminals at the positions that correspond to the terminals, respectively, which are provided to the non-rotation dependent connecting portion 63. The earphone connector 62 includes a left speaker terminal L, a right speaker terminal R, a ground terminal G, and mic terminal M, and additionally includes a left ANC mic terminal ANC_MIC_L, and a right ANC mic terminal ANC_MIC_R. As shown in FIG. 7, the left ANC mic terminal ANC_MIC_L and the right ANC mic terminal ANC_MIC_R are arranged at the innermost portion of the earphone connector 62.

Accordingly, the left ANC mic terminal ANC_MIC_L and the right ANC mic terminal ANC_MIC_R are arranged in positions corresponding to positions of the existing four terminals, to allow other functions to be performed.

As described above, the first body 65 functions as another earphone connector. On one side region of the first body 65, a plurality of terminals are arranged, similar to the arrangement of the plurality of terminals of the earphone connector 62 described herein. The first body 65 includes a plurality of connecting terminals that correspond to the rotation dependent connecting portion 64. As described above, the earphone connector 65 includes a left speaker terminal L, a right speaker terminal R, a ground terminal G, and a mic terminal M on one side region thereof, and additionally includes a left ANC mic terminal ANC_MIC_L and a right ANC mic terminal ANC_MIC_R. As shown in FIGS. 7 and 8, the left ANC mic terminal ANC_MIC_L and the right ANC mic terminal ANC_MIC_R are arranged at the lowermost side. The left ANC mic terminal ANC_MIC_L and the right ANC mic terminal ANC_MIC_L are arranged below the existing four terminals (i.e., the left speaker terminal L, the right speaker terminal R, the ground terminal G, and the mic terminal M, with the order of arranging the left ANC mic terminal ANC_MIC_L and the right ANC mic terminal ANC_MIC_R not being so limited.)

On the other side, i.e., the left side region (FIG. 8) of the first body 65, the left speaker terminal L, the right speaker terminal R, the ground terminal G, and the mic terminal M, are arranged to correspond to the poles utilized by a conventional 4-pole audio plug.

Referring to FIG. 8, when the exposed non-rotation dependent connecting portion 63 is partially retracted into the first body 65, and when the earphone plug 61 is rotated by approximately 180 degrees, the ground terminal G and the mic terminal M of the non-rotation dependent connecting portion 63 retract into the first body 65, and the connecting terminals positioned on the right side of the rotation dependent connecting portion 64 (FIG. 7), are positioned within the first body 65.

In this 6-pole audio connector state, the left ANC_Mic terminal ANC_MIC_L of the non-rotation dependent connecting portion 63 is connected to the left speaker terminal L of the earphone connector, and the right ANC mic terminal ANC_MIC_R is connected to the right speaker terminal R of the earphone connector. In addition, the left speaker terminal L of the non-rotation dependent connecting portion 63 is connected to the ground terminal G of the earphone connector, and the right speaker terminal R of the non-rotation dependent connecting portion 63 is connected to the mic terminal M of the earphone connector.

When the ground terminal G and the mic terminal M of the earphone plug retract into the first body 65 in the 6-pole audio connector state, and the rotation dependent connecting portion 64 is rotated approximately 180 degrees, the 6-pole audio connector state is consequently operates as a conventional 4-pole earphone plug.

Figure 9A:
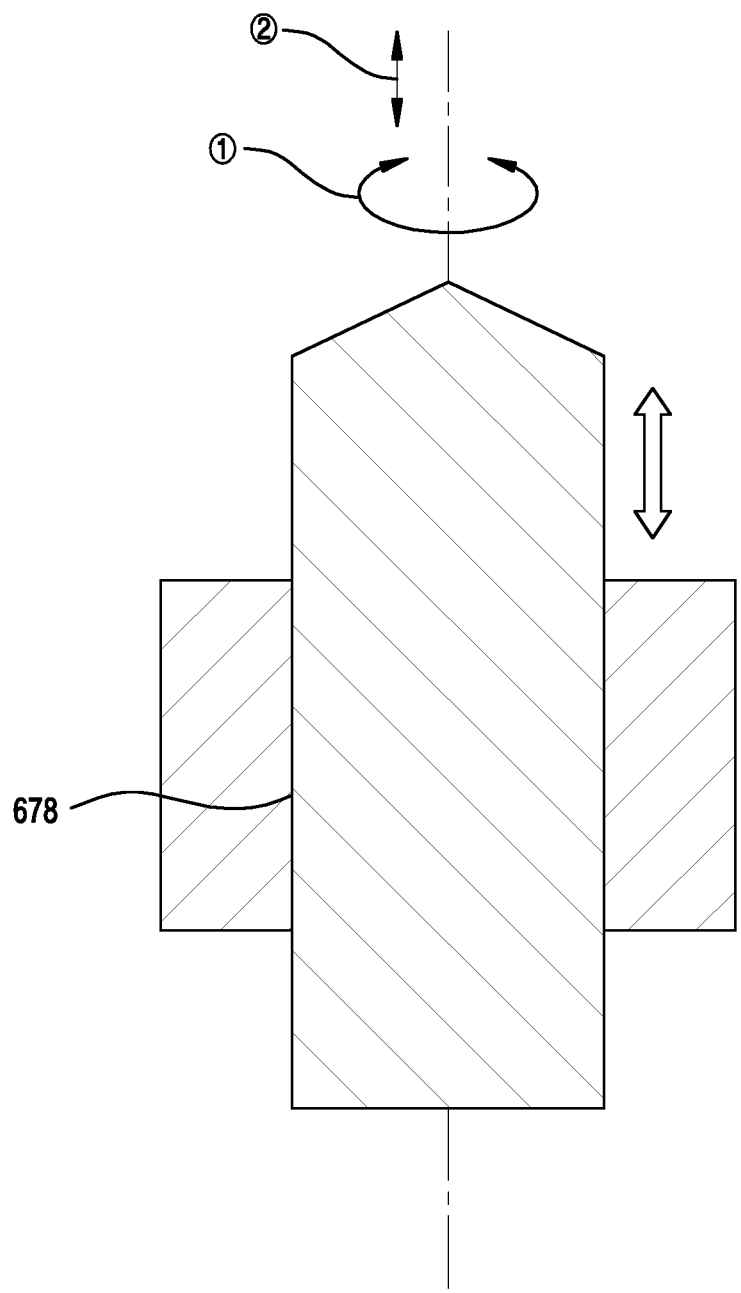
FIGS. 9A and 9B illustrate an inner structure that converts a 6-pole audio connector into a 4-pole audio connector according to an embodiment of the present disclosure.
Figure 9B:
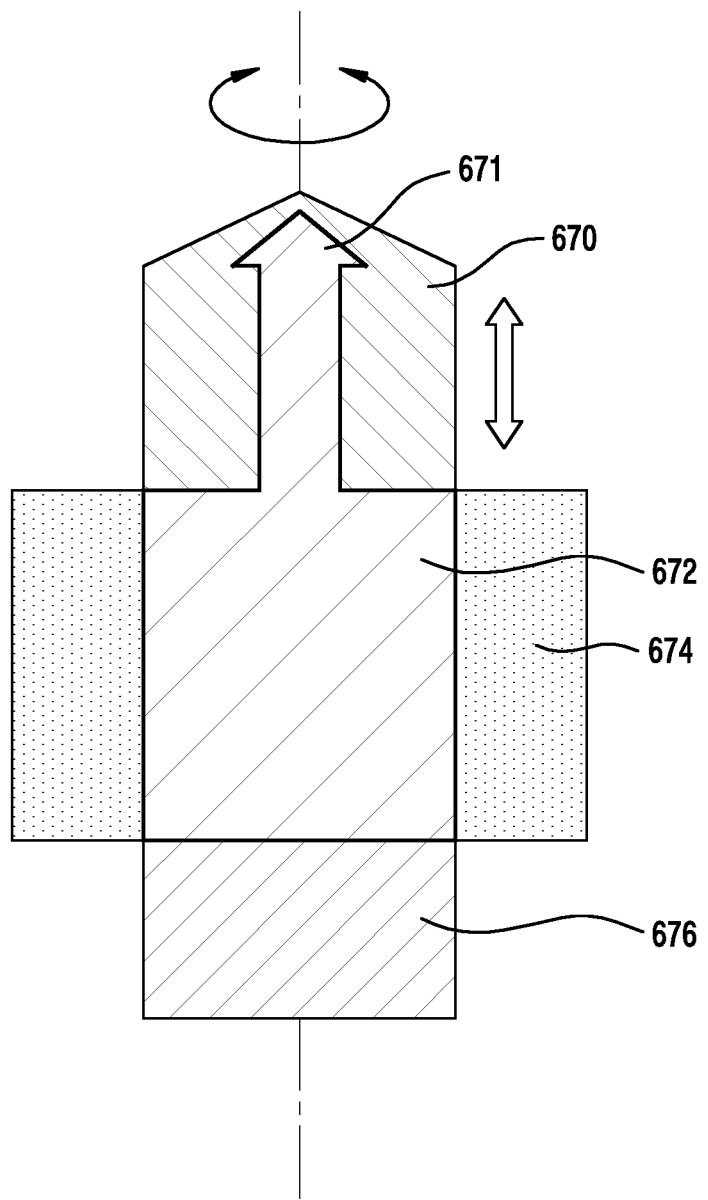

FIGS. 9A and 9B illustrate an inner structure that converts a 6-pole audio connector into a 4-pole audio connector according to an embodiment of the present disclosure.

FIG. 9A illustrates movement and rotation of an inner structure 678. FIG. 9B illustrates the connection relationship between the rotation dependent connecting portion 672 and the non-rotation dependent connecting portion 670 are as follows. The rotation dependent connecting portion 672 and the non-rotation dependent connecting portion 670 are connected to each other to be movable in unison, and to be rotatable about a central axis that extends in the longitudinal direction. The rotation dependent connecting portion 672 and the non-rotation dependent connecting portion 670 are separated from each other by an insulating material, and a locking structure 671 is provided in an upper end of the non-rotation dependent connecting portion 670 to implement the above described connection relationship. In addition, the rotation dependent connecting portion 672 and the non-rotation dependent connecting portion 670 are configured to be movable in the hollow first body 674. The second body 676 is injection-molded product to serve as a handle, to move and/or rotate the rotation dependent connecting portion 672 and the non-rotation dependent connecting portion 670.

Figure 10:
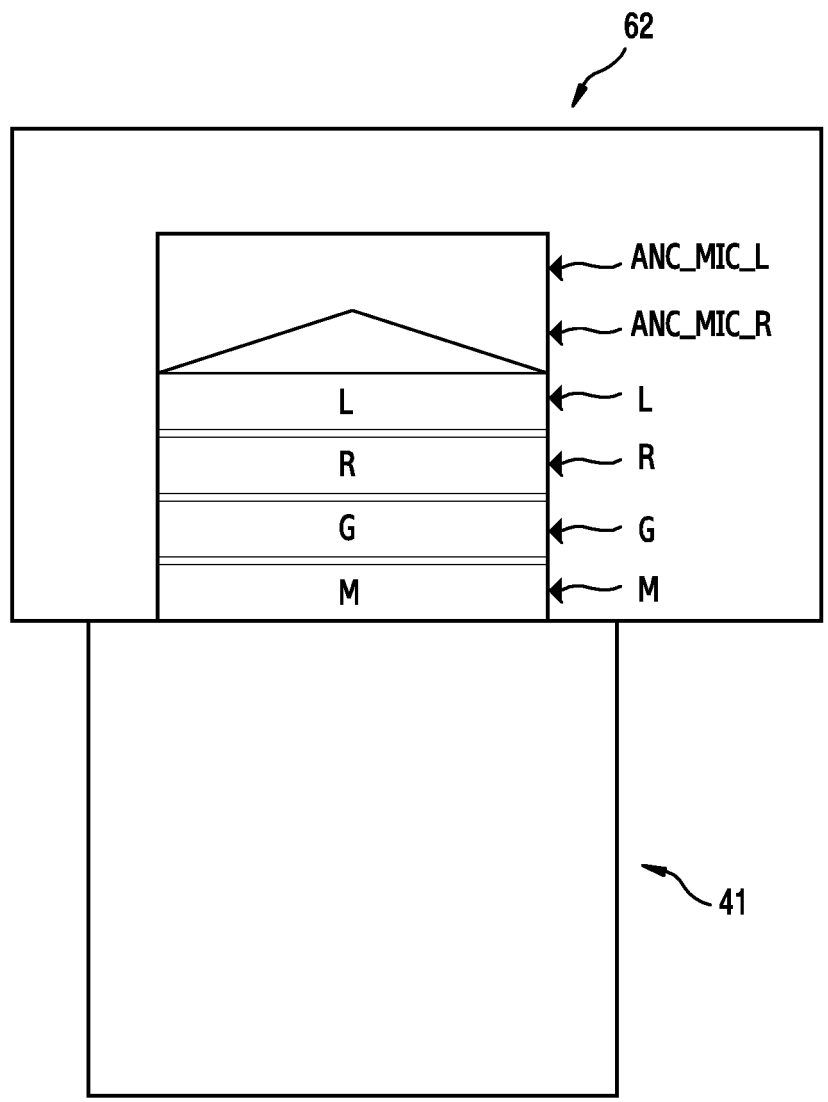
FIG. 10 illustrates a state in which an ordinary 4-pole earphone plug is inserted into and connected to a 6-pole earphone connector according to an embodiment of the present disclosure.

FIG. 10 illustrates a state in which a 4-pole earphone plug is inserted into and connected to a 6-pole earphone connector according to an embodiment of the present disclosure.

Referring to FIG. 10, the earphone connector 62 of the audio connector is used as a 4-pole earphone plug. As shown in FIG. 10, the left ANC mic terminal ANC_MIC_L and the right ANC mic terminal ANC_MIC_R of the earphone connector 62 do not contact any of the left speaker terminal L, the right speaker terminal R, the ground terminal R, and the mic terminal M of the earphone plug 41. Therefore, the 4-pole earphone plug 41 is not connected with the left ANC mic terminal ANC_MIC_L and the right ANC mic terminal ANC_MIC_R. Although the earphone connector 62 allows for insertion and connection of the 4-pole earphone plug 41, operation is performed without connection of the left ANC mic terminal ANC_MIC_L and the right ANC mic terminal ANC_MIC_R of the earphone connector 62.

Figure 11:
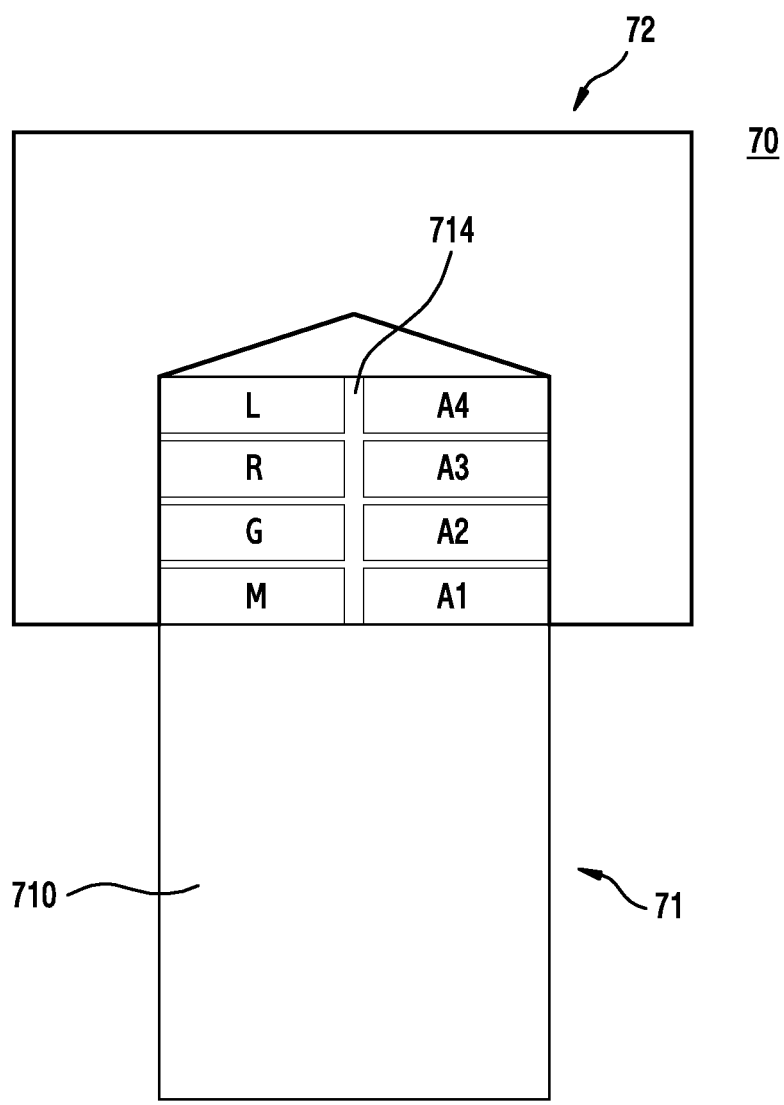
FIG. 11 illustrates an 8-pole audio connector according to an embodiment of the present disclosure.

FIG. 11 illustrates an 8-pole audio connector according to an embodiment of the present disclosure.

Referring to FIG. 11, the audio connector 70 includes a multi-pole earphone plug 71 and a multi-pole earphone connector 72. The earphone plug 71 has a substantially cylindrical shape, and includes a connecting portion and a body 710 in which a plurality of terminals are sequentially arranged along the longitudinal direction.

The outer peripheral surface of the earphone plug 71 is divided (separated) into two halves, i.e. a first region and a second region, by an insulator 714. The first and second regions are separated from each other by the insulator 714, and are arranged opposite to each other with reference to the insulator 714. In the first region, a plurality of first terminals are arranged in a vertically stacked form, and in the second region, a plurality of second terminals are arranged in a vertically stacked form. The first terminals include a left speaker terminal L, a right speaker terminal R, a ground terminal G, and a mic terminal M, as described above. The second terminals include first to fourth additional terminals A1 to A4 that perform additional functions.

The earphone connector 72 includes a left speaker terminal L, a right speaker terminal R, a ground terminal G, and a mic terminal M that correspond to the terminals that are provided in the earphone plug 71, respectively, in the position where the earphone plug 71 is inserted, and the 8 pole terminals are arranged on the earphone plug 71.

Figure 12:
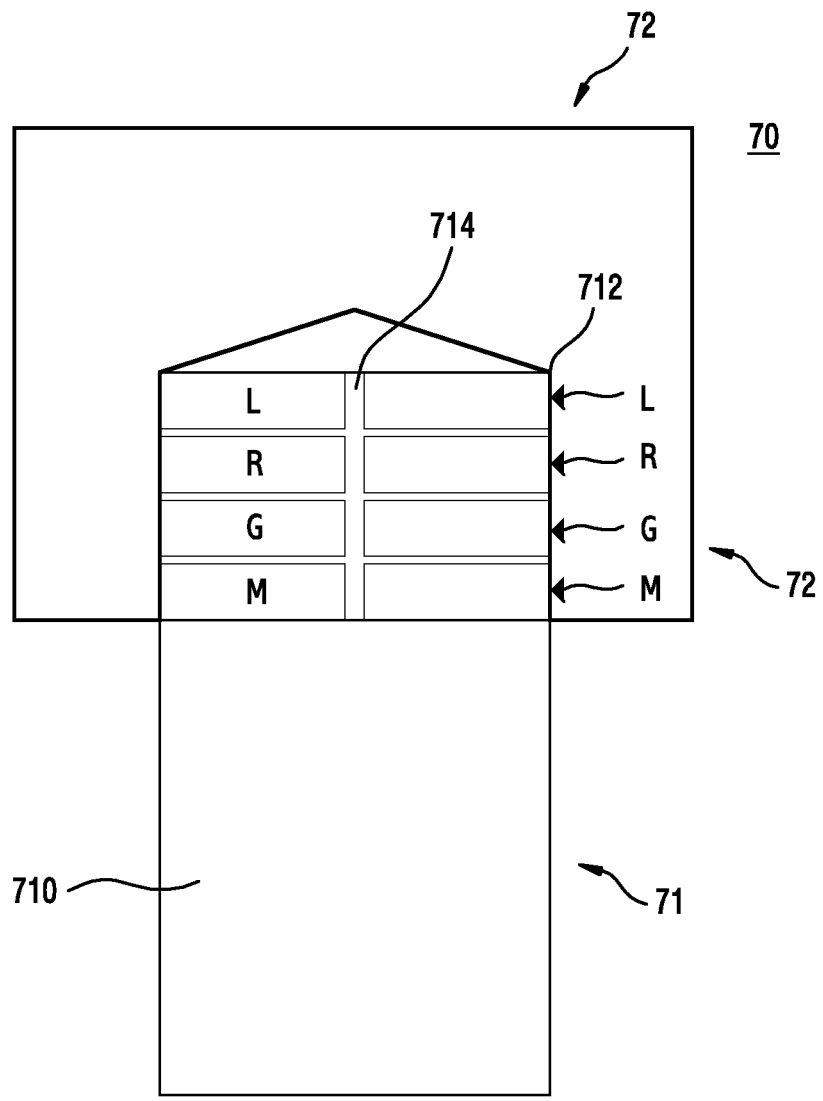
FIG. 12 illustrates a state in which an 8-pole audio connector is converted into a 4-pole audio connector according to an embodiment of the present disclosure.
Figure 13A:
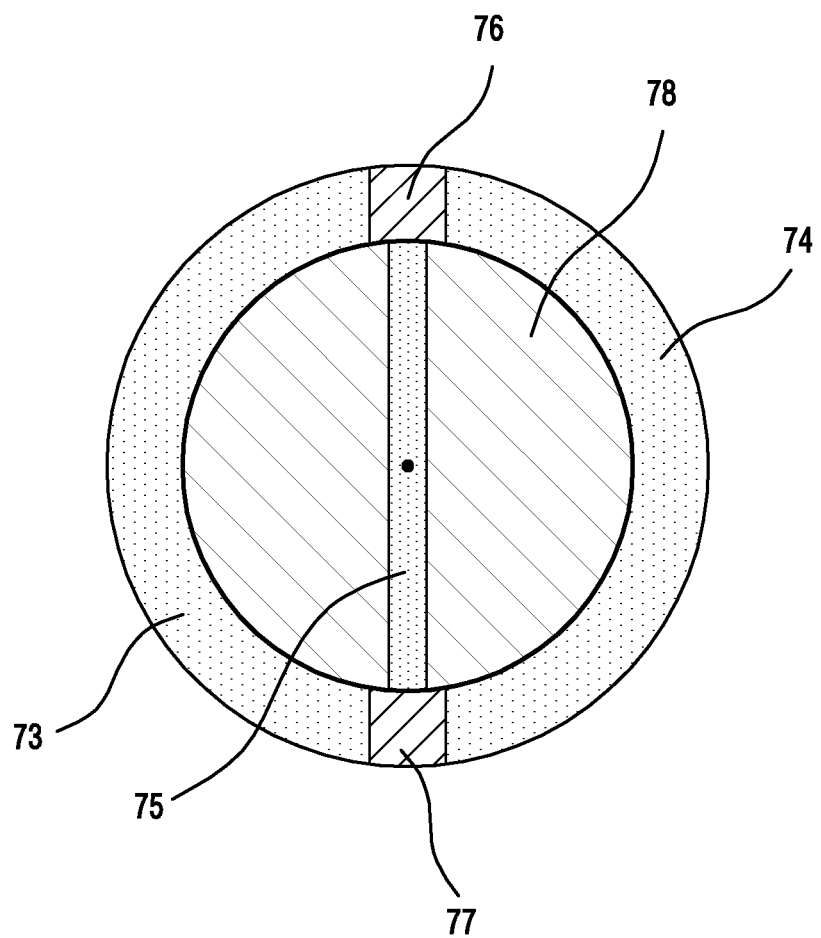
FIGS. 13A and 13B each illustrate a structure in which an 8-pole audio connector is converted into a 4-pole audio connector according to an embodiment of the present disclosure.
Figure 13B:
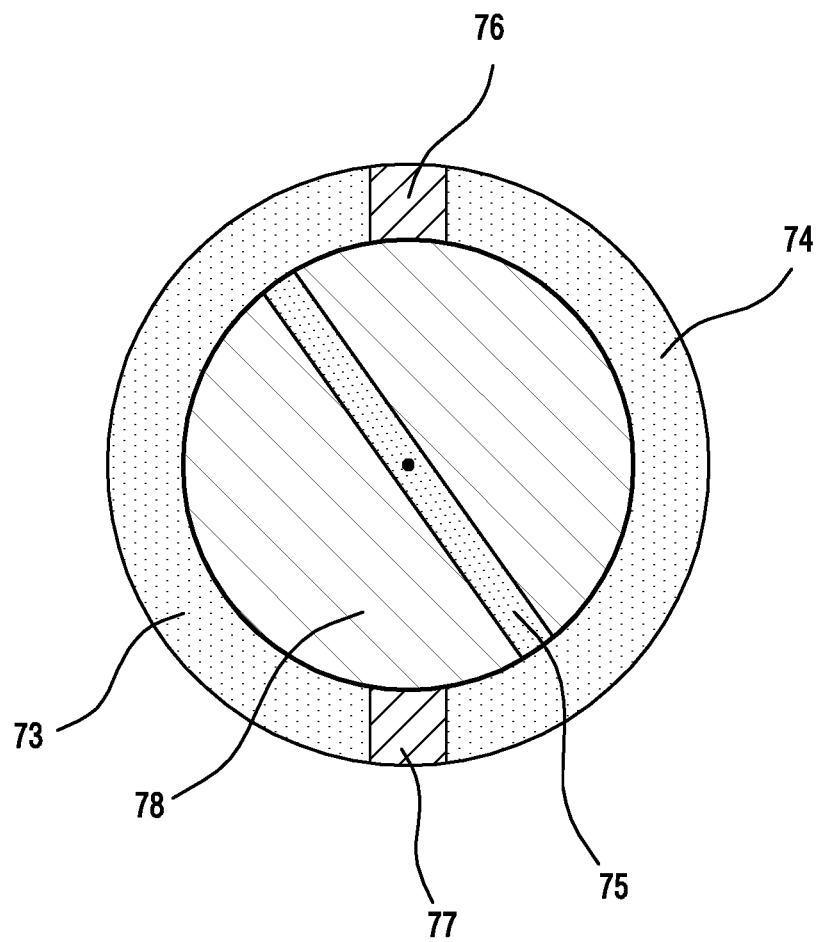

FIG. 12 illustrates a state in which an 8-pole audio connector is converted into a 4-pole audio connector according to an embodiment of the present disclosure. FIGS. 13A and 13B each illustrate a structure in which an 8-pole audio connector is converted into a 4-pole audio connector according to an embodiment of the present disclosure.

FIG. 12 illustrates a 4-pole audio connector. Referring to FIGS. 13A and 13B, the connecting portion of the earphone plug includes at least one fixed body 73 and 74, and a rotary body 75. The fixed bodies 73 and 74 are also referred to as an external connecting portion, and the rotary body 75 is referred to as an internal connecting portion. The connecting portion 75 rotates within the external connecting portions 73 and 74, and the inner connecting portion 75 is insulated from the external connecting portions 73 and 74.

Each of the external connecting portions 73 and 74 and the internal connecting portion 75 may include a combination of a conductor and a non-conductor. Depending on the rotation of the inner connecting portion 75, the external connecting portions 73 and 74 and the internal connecting portion 75 form a mutually conductive state or a mutually insulative state, to convert between a number of poles.

The external connecting portions 73 and 74 are formed of a combination of a conductor and a non-conductor, and the inner connecting portion 75 is formed of a combination of a conductor and a non-conductor. The external connecting portions 73 and 74 include first and second connecting surfaces, which are bisected by the first insulators 76 and 77, respectively. The inner connecting portion 75 includes a linear conductor portion that is insulated from the first and second connecting surfaces by a second insulator 78.

FIG. 13A shows the first and second connecting surfaces are insulated from each other by the first and second insulators 76 and 77 to maintain an 8-pole earphone plug state.

FIG. 13B shows the internal connecting portion 75 slightly rotated in a counterclockwise direction, thereby forming a mutually conductive state of the first and second connecting surfaces. Accordingly, the first and second connecting surfaces form one conductive terminal surface to maintain a 4-pole earphone plug state, as shown in FIG. 12.

Figure 14:
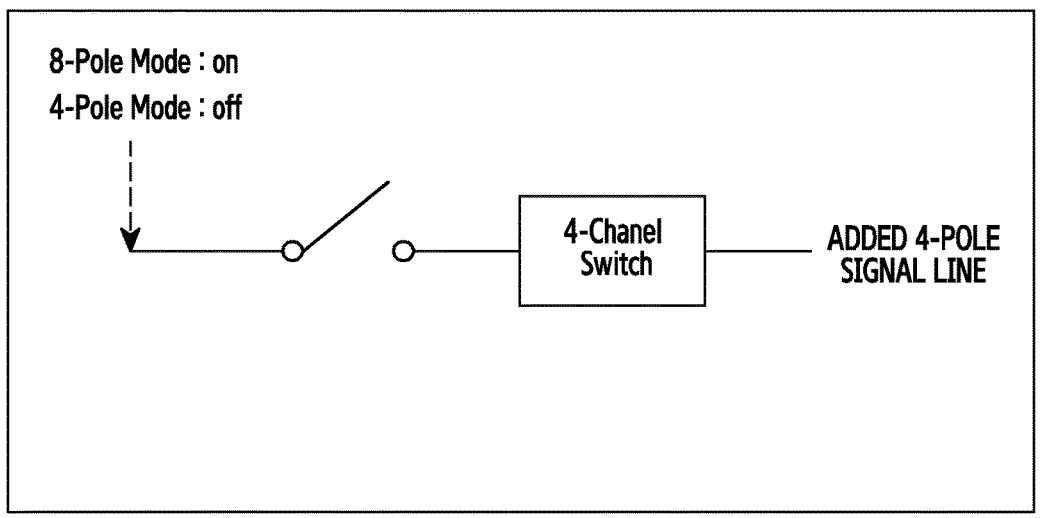
FIG. 14 illustrates a circuit in which an 8-pole audio connector is converted into a 4-pole audio connector according to an embodiment of the present disclosure.

FIG. 14 illustrates a circuit in which an 8-pole audio connector is converted into a 4-pole audio connector according to an embodiment of the present disclosure.

Referring to FIG. 14 a switching element is used to convert the audio connector from a 4-pole audio connector to an 8-pole audio connector, or from an 8-pole audio connector to a 4-pole audio connector. When the switching element is turned on, 4 channels of signal lines are added by the 4-channel switch so that an 8-pole audio connector is operated at an 8-pole mode. When the switching element is turned off, the 4 channels of signal lines are removed from the 8-channel switch to operate in a 4-pole mode.

Figure 15A:
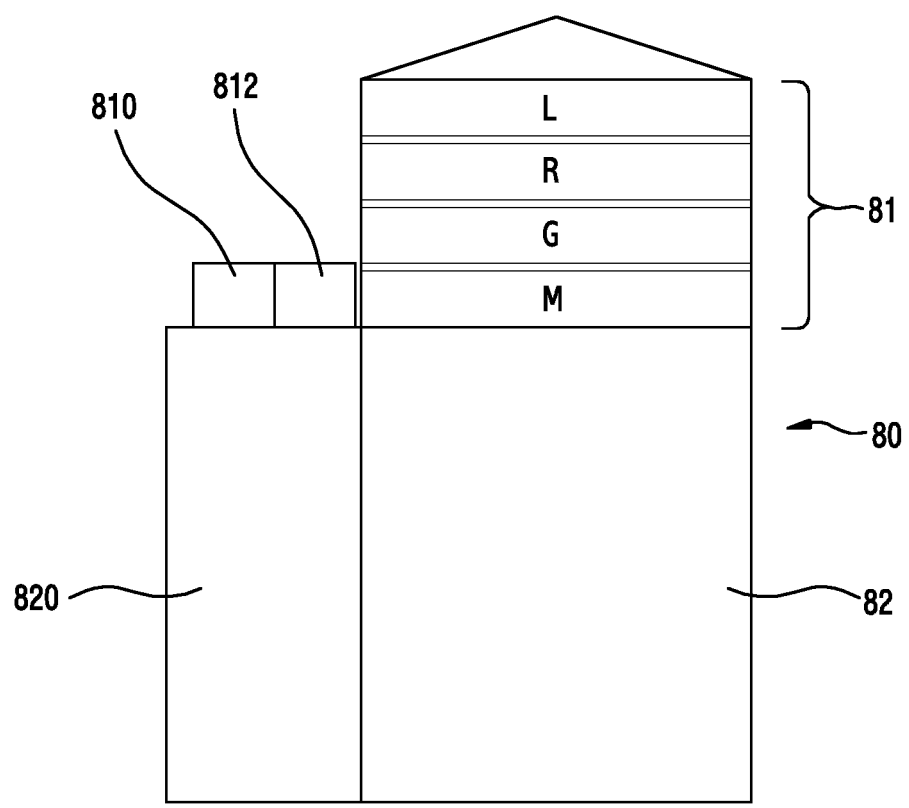
FIG. 15A illustrates a 6-pole audio connector according to an embodiment of the present disclosure.
Figure 15B:
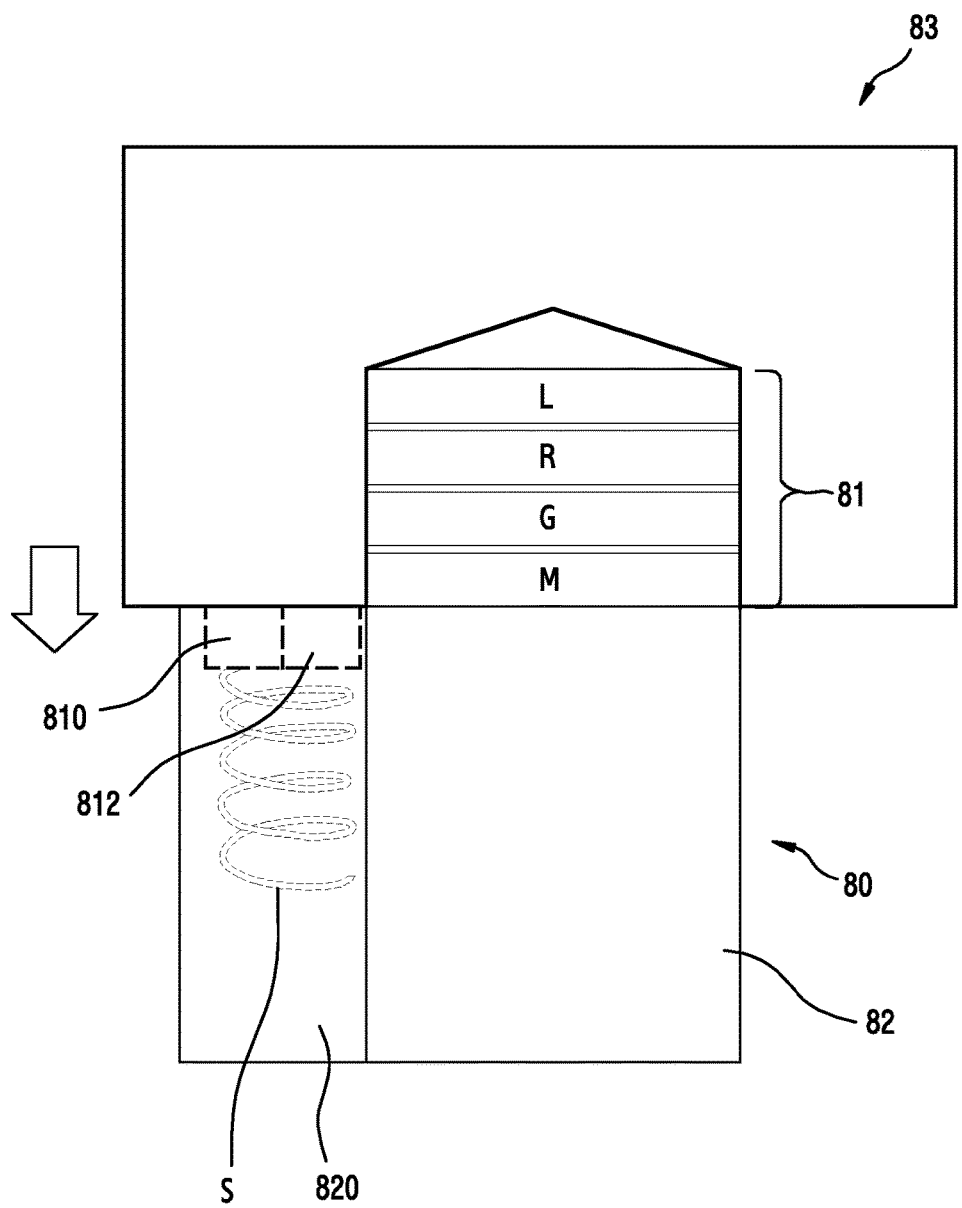
FIG. 15B illustrates a state in which two terminals of a 6-pole audio connector are introduced according to an embodiment of the present disclosure.

FIG. 15A illustrates a 6-pole audio connector according to an embodiment of the present disclosure. FIG. 15B illustrates a state in which two terminals of a 6-pole audio connector are introduced according to an embodiment of the present disclosure.

Referring to FIGS. 15A and 15B, as already described above with reference to FIG. 6, the left ANC mic terminal ANC_MIC_L and the right ANC mic terminal ANC_MIC_R are arranged to protrude from or retract into the body 820. However, the audio connector has a disadvantage in that it can be used only when an electronic device is provided with a dedicated earphone connector, and cannot be used for an ordinary 3-pole or 4-pole earphone connector.

In order to solve this problem, an audio connector is configured such that a left ANC mic terminal 810 and a right audio connector mic terminal 812 are movable in the longitudinal direction of the connecting portion 81 of the earphone plug 80, and are supported by an elastic body S. Referring to FIG. 15B, when the 6-pole earphone plug 80 is inserted into an ordinary earphone connector, the left ANC mic terminal 810 and the right ANC mic terminal 812 are move into the body 820 such that the 6-pole earphone plug connecting portion 81 is inserted into and connected to the 4-pole earphone connector.

Figure 16A:
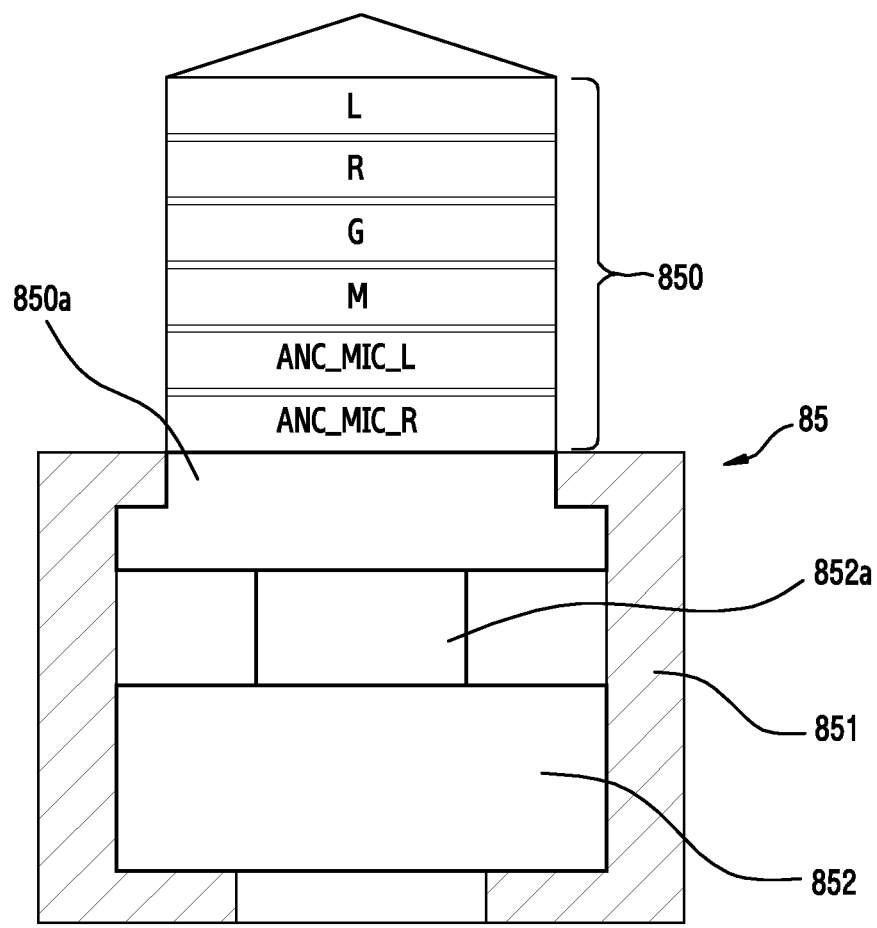
FIGS. 16A and 16B each illustrate an audio connector of which the polarity is converted into six poles or four poles according to an embodiment of the present disclosure.
Figure 16B:
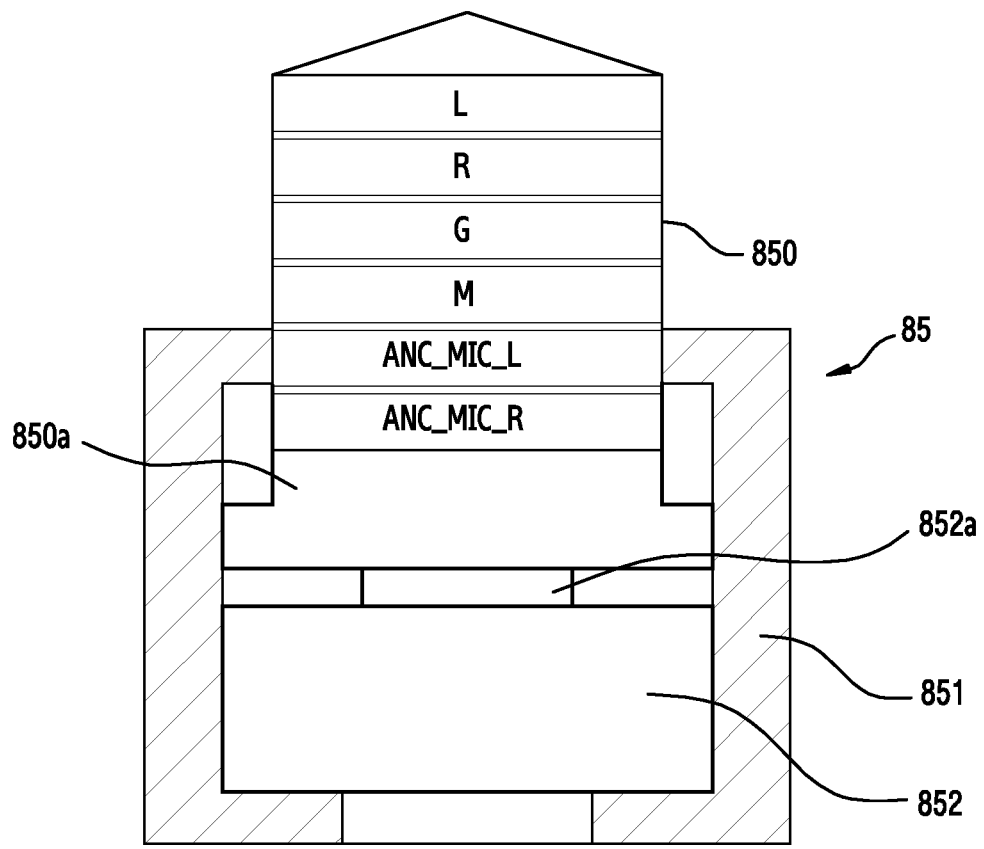

FIGS. 16A and 16B each illustrate a connector, to convert to six poles or four poles according to an embodiment of the present disclosure.

Referring to FIG. 16A, an earphone plug 85 is provided with a protrusion/retraction device within the body (housing) 851 thereof. Depending on whether the connecting portion 850 is pushed or not, a connecting portion (6-pole terminal) 850 or a connecting portion (4-pole terminal) is exposed from the body 851 and is used. The retraction/protrusion device 852 is fixedly mounted within the body 851 to be connected to the lower end 850a of the earphone plug 85. The retraction/protrusion device 852 is provided with an actuator 852a, to retract into or protrude out from the retraction/protrusion device 852 by a predetermined length. The upper end of the actuator 852a is connected to the lower end 850a of the earphone plug to be integrally moved with the lower end 850a of the earphone plug. The movement includes a movement of retracting into or protruding out from the body 851.

As illustrated in FIG. 16A, in the connecting portion 850 of the earphone plug 85, the 6-pole terminals (i.e., the left speaker terminal L, the right speaker terminal R, the ground terminal G, the mic terminal M, the left ANC mic terminal ANC_MIC_L, the right ANC mic terminal ANC_MIC_R) are arranged outside the body 851. The left ANC mic terminal ANC_MIC_L and the right ANC mic terminal ANC_MIC_R are arranged below the 4 terminals. When the earphone plug is pushed, the state illustrated in FIG. 16B is obtained.

As illustrated in FIG. 16B, in the connecting portion 850 of the earphone plug 85, the 4 pole terminals (e.g., the left speaker terminal L, the right speaker terminal R, the ground terminal G, and the mic terminal M) are arranged outside the body 851. The left ANC mic terminal ANC_MIC_L and the right ANC mic terminal ANC_MIC_R are arranged to be accommodated and concealed within the body 851.

In state illustrated in FIG. 16B, the audio connector is used as a 4-pole audio connector.

FIGS. 17A to 17D illustrate 5-pole audio connectors according to embodiments of the present disclosure, with various embodiments for the 5-pole earphone plug depending on the arrangement position of an insulator.

Figure 17A:
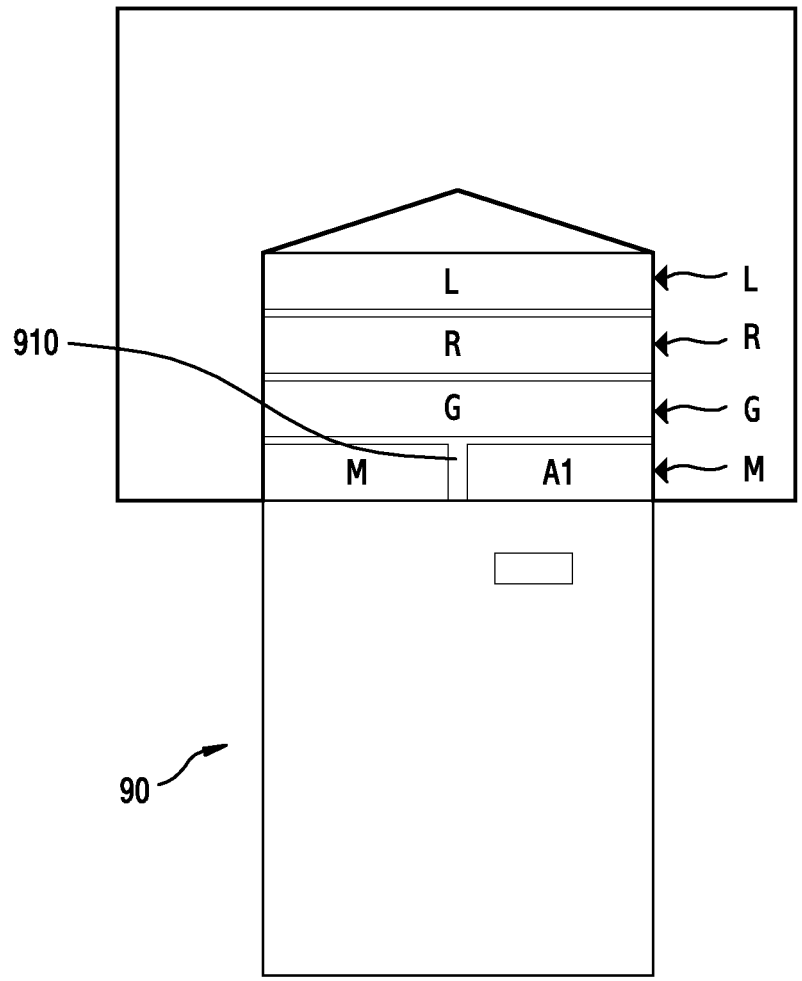
FIGS. 17A to 17D illustrate 5-pole audio connectors according to embodiments of the present disclosure.

Referring to FIG. 17A, an earphone plug 90 includes a left speaker terminal L, a right speaker terminal R, a ground terminal G, and a mic terminal M, and an additional connecting terminal A1, to additionally perform a first function, configured by approximately bisecting the connecting surface of the mic terminal M by an insulator 910.

Figure 17B:
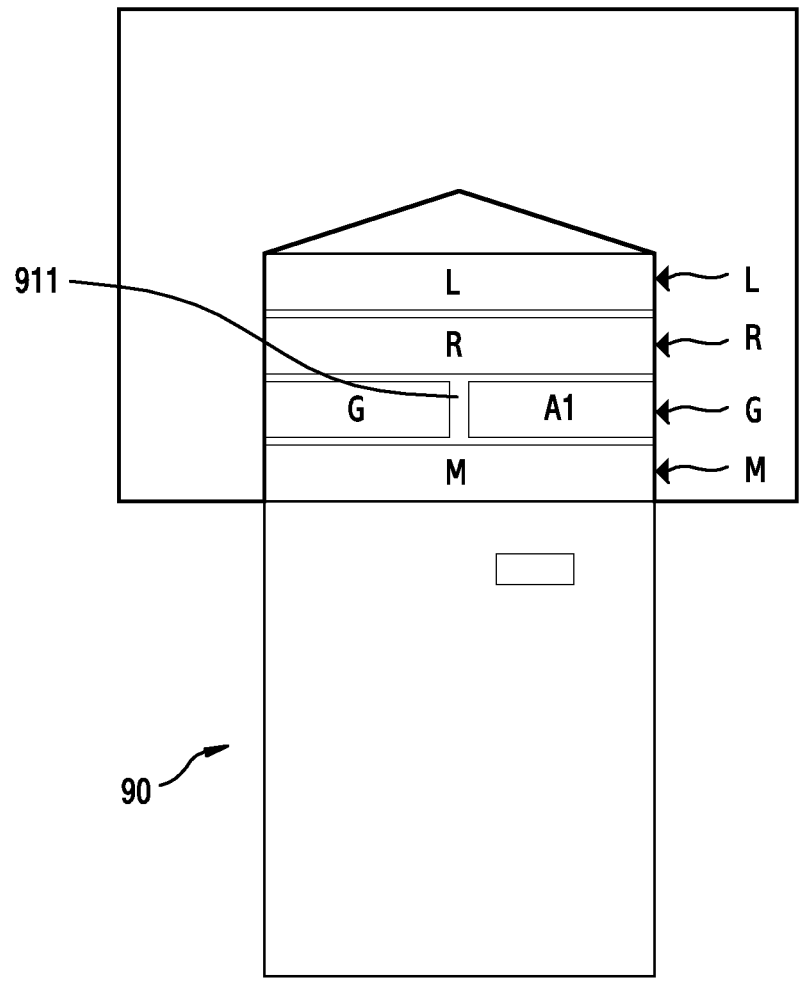

Referring to FIG. 17B, an earphone plug 90 includes a left speaker terminal L, a right speaker terminal R, a ground terminal G, and a mic terminal M, and an additional connecting terminal A1, to additionally perform a first function, configured by approximately bisecting the connecting surface of the ground terminal G by an insulator 911.

Figure 17C:
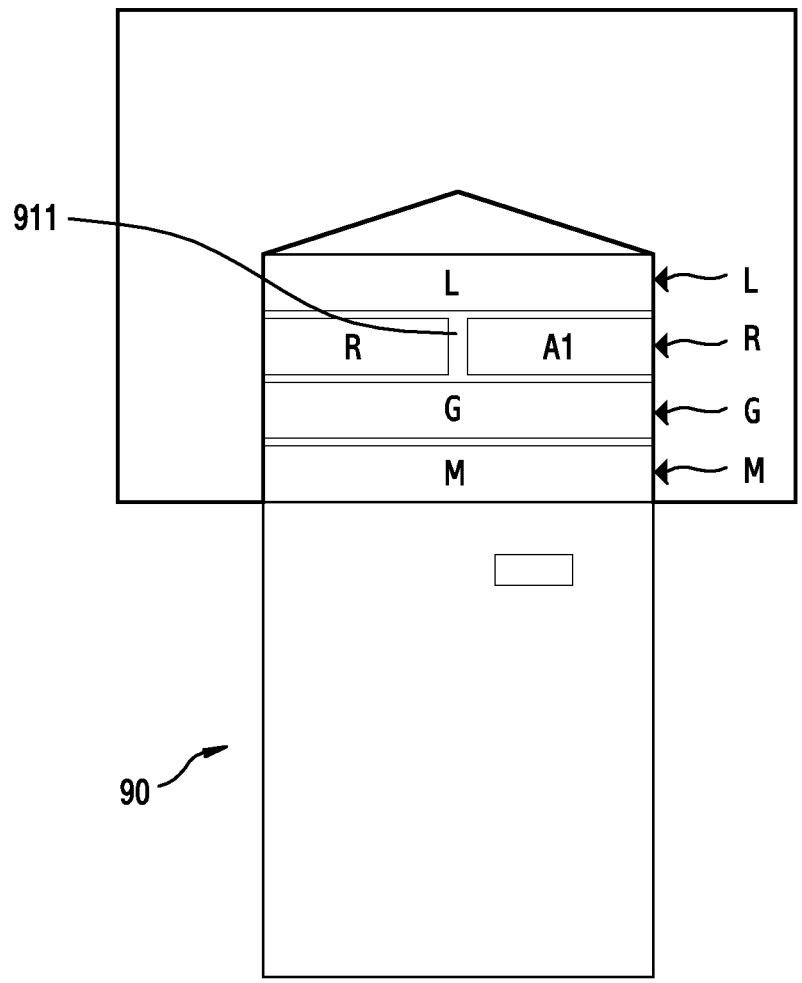

Referring to FIG. 17C, an earphone plug 90 includes a left speaker terminal L, a right speaker terminal R, a ground terminal G, and a mic terminal M, and an additional connecting terminal A1, to additionally perform a first function, configured by approximately bisecting the connecting surface of the right speaker terminal R by an insulator 912.

Figure 17D:
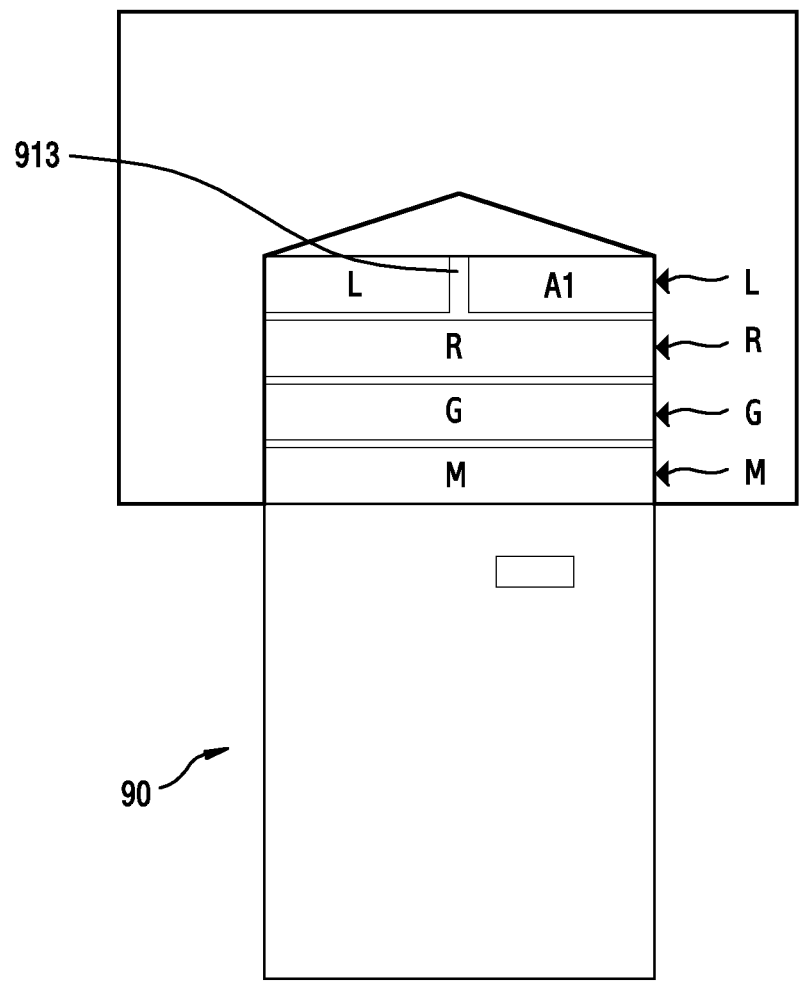

Referring to FIG. 17D, an earphone plug 90 includes a left speaker terminal L, a right speaker terminal R, a ground terminal G, and a mic terminal M, and an additional connecting terminal A1, to additionally perform a first function, configured by approximately bisecting the connecting surface of the left speaker terminal L by an insulator 913.

FIGS. 18A to 18F illustrate 6-pole audio connectors according to embodiments of the present disclosure, with various embodiments made for the 6-pole earphone plug, depending on the arrangement position of an insulator.

Figure 18A:
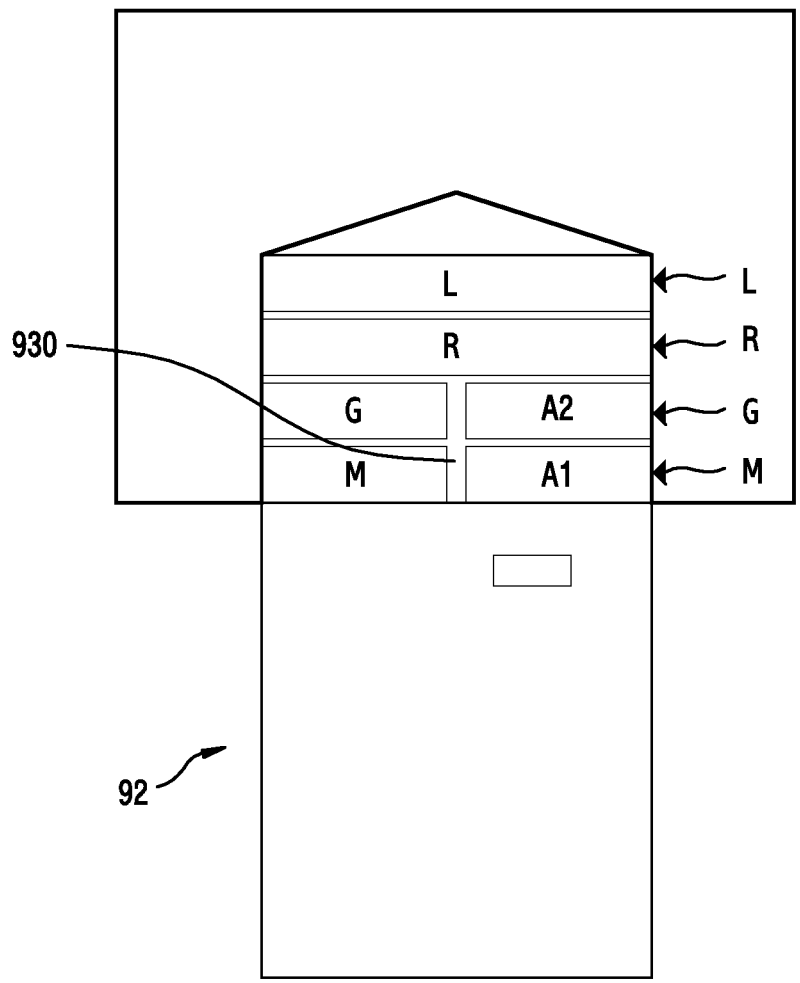
FIGS. 18A to 18F illustrate 6-pole audio connectors according to embodiments of the present disclosure.

Referring to FIG. 18A, an earphone plug 92 includes a left speaker terminal L, a right speaker terminal R, a ground terminal G, and a mic terminal M, a first additional connecting terminal A1, which may additionally perform a first function, and a second additional connecting terminal A2, which may additionally perform a second function, configured by approximately bisecting the connecting surfaces of the ground terminal G and the mic terminal M by an insulator 930.

Figure 18B:
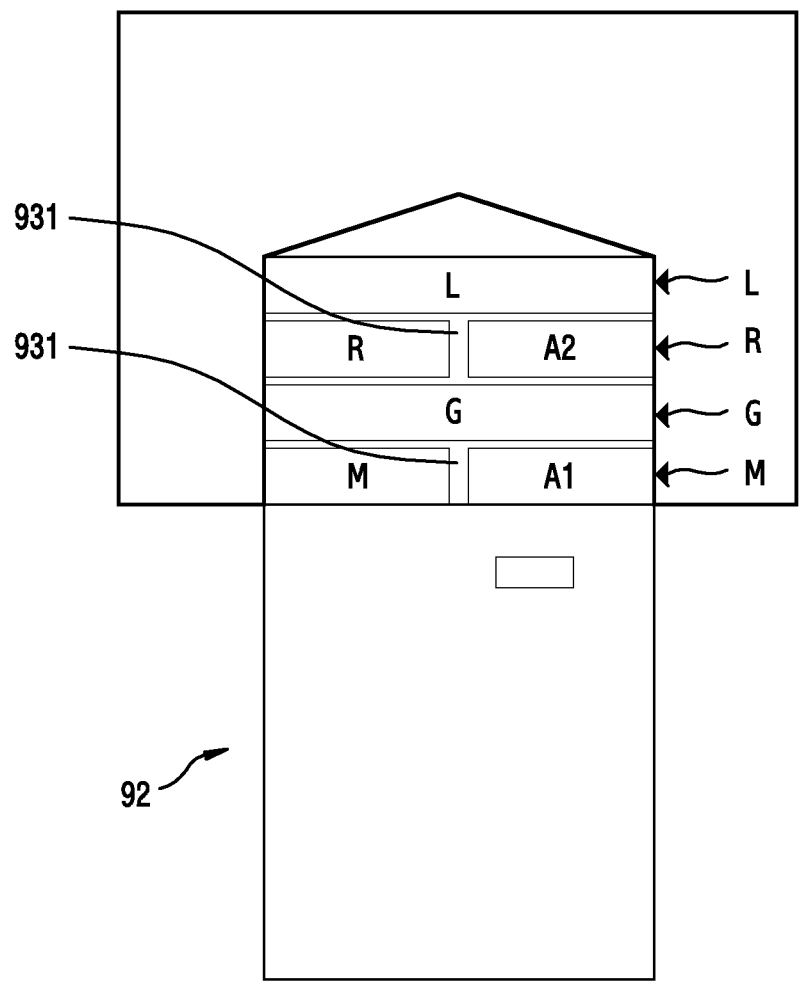

Referring to FIG. 18B, an earphone plug 92 includes a left speaker terminal L, a right speaker terminal R, a ground terminal G, and a mic terminal M, a first additional connecting terminal A1, which may additionally perform a first function, and a second additional connecting terminal A2, which may additionally perform a second function, configured by approximately bisecting the connecting surfaces of the right speaker terminal R and the mic terminal M by insulators 931.

Figure 18C:
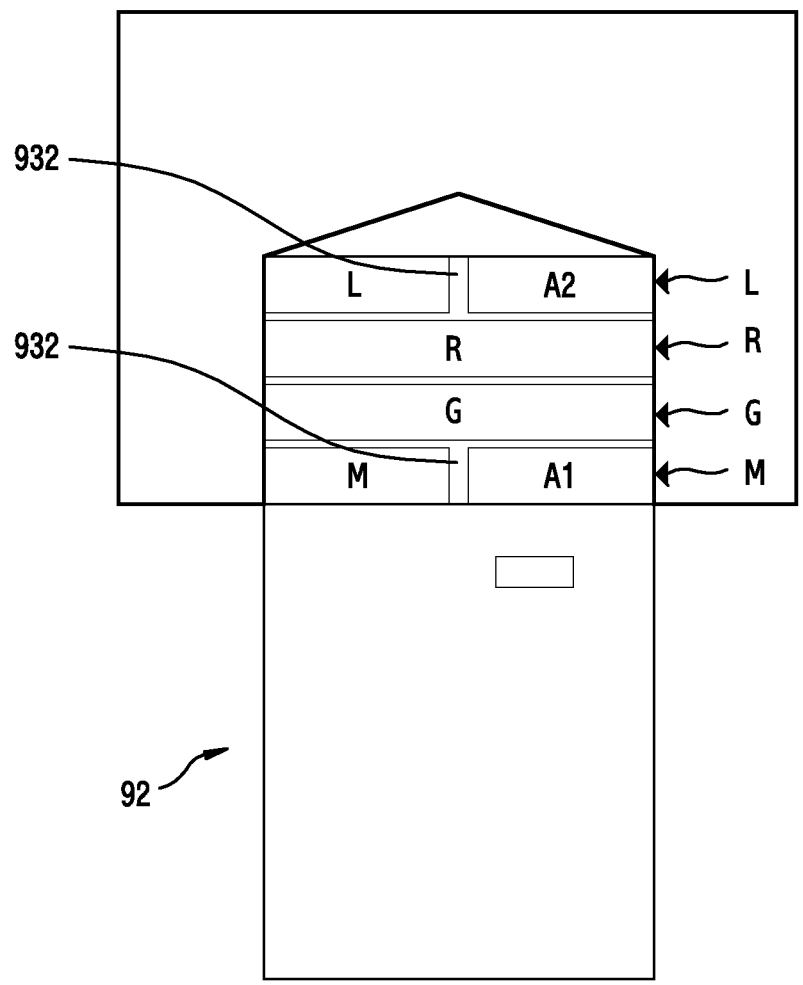

Referring to FIG. 18C, an earphone plug 92 includes a left speaker terminal L, a right speaker terminal R, a ground terminal G, and a mic terminal M, a first additional connecting terminal A1, which may additionally perform a first function, and a second additional connecting terminal A2, which may additionally perform a second function, configured by approximately bisecting each of the connecting surfaces of the left speaker terminal L and the mic terminal M by insulators 932.

Figure 18D:
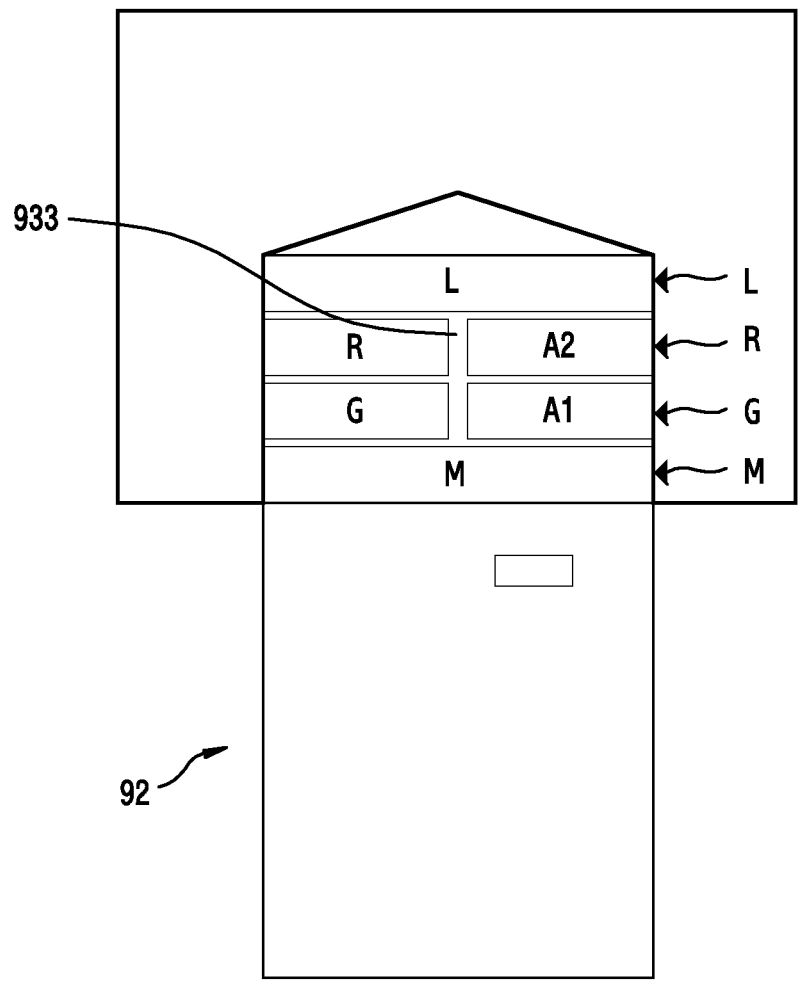

Referring to FIG. 18D, an earphone plug 92 includes a left speaker terminal L, a right speaker terminal R, a ground terminal G, and a mic terminal, a first additional connecting terminal A1, which may additionally perform a first function, and a second additional connecting terminal A2, which may additionally perform a second function, configured by approximately bisecting each of the connecting surfaces of the right speaker terminal R and the ground terminal G by an insulator 933.

Figure 18E:
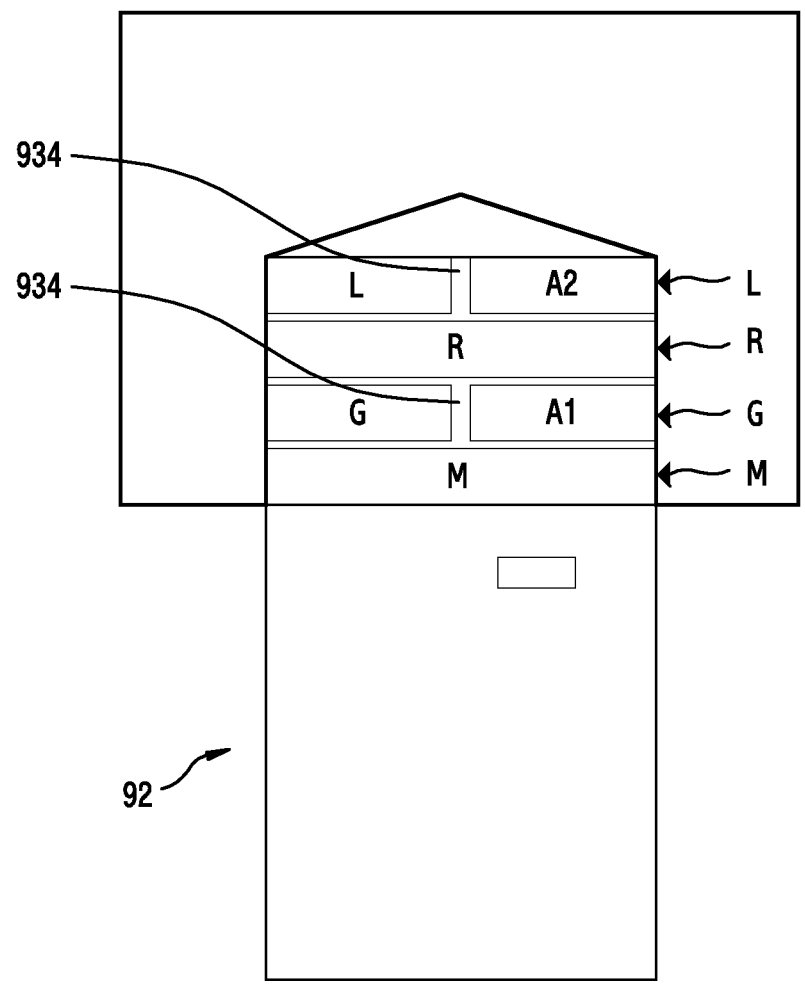

Referring to FIG. 18E, an earphone plug 92 includes a left speaker terminal L, a right speaker terminal R, a ground terminal G, and a mic terminal M, a first additional connecting terminal A1, which may additionally perform a first function, and a second additional connecting terminal A2, which may additionally perform a second function, configured by approximately bisecting each of the connecting surfaces of the left speaker terminal L and the ground terminal G by insulators 934.

Figure 18F:
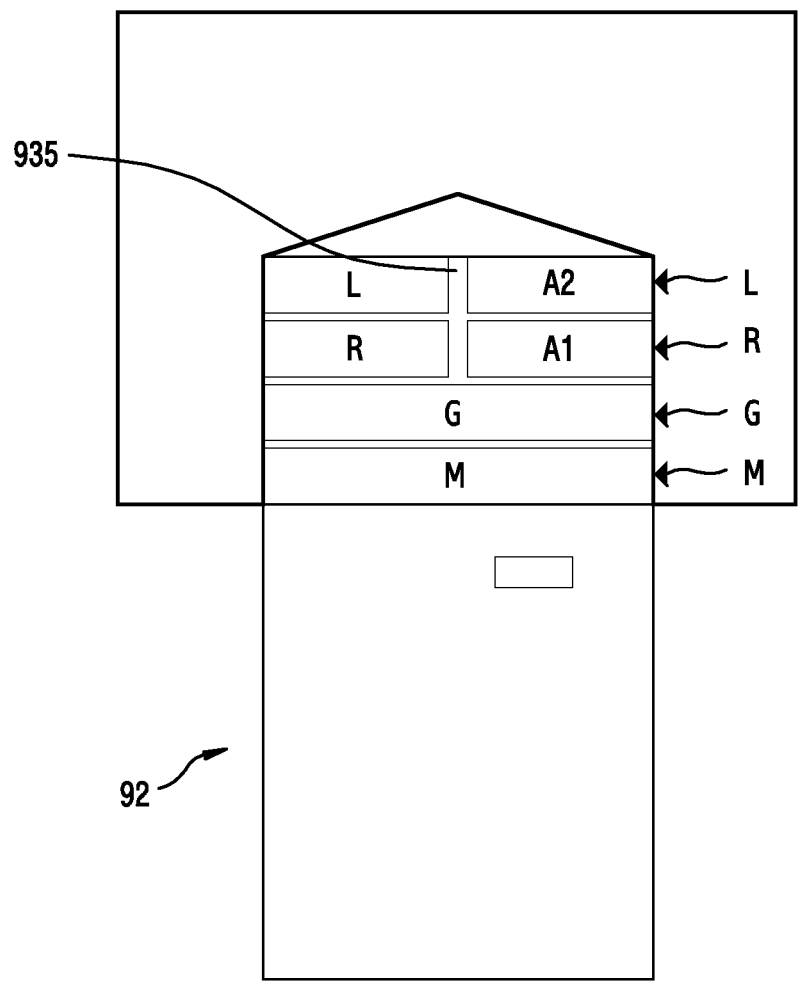

Referring to FIG. 18F, an earphone plug 92 includes a left speaker terminal L, a right speaker terminal R, a ground terminal G, and a mic terminal M, a first additional connecting terminal A1, which may additionally perform a first function, and a second additional connecting terminal A2, which may additionally perform a second function, configured by approximately bisecting each of the connecting surfaces of the left speaker terminal L and the right speaker terminal R by an insulator 935.

FIGS. 19A to 19D illustrate 7-pole audio connectors according to embodiments of the present disclosure, with various embodiments for the 7-pole earphone plug, depending on the arrangement position of an insulator.

Figure 19A:
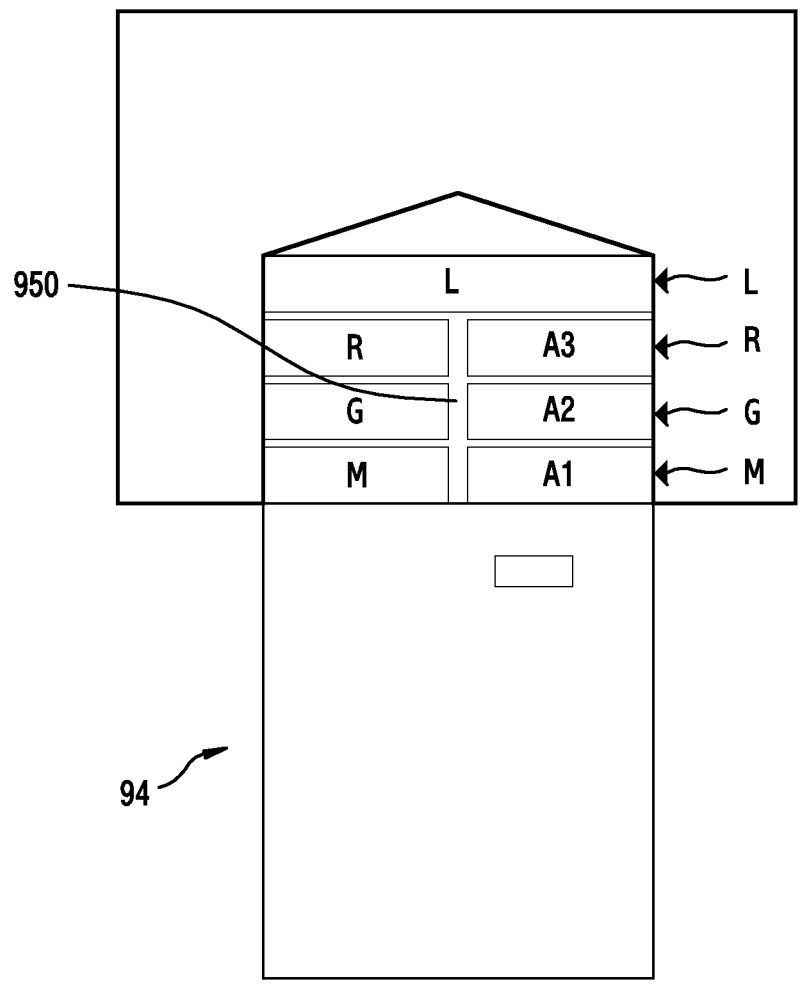
FIGS. 19A to 19D illustrate 7-pole audio connectors according to embodiments of the present disclosure.

Referring to FIG. 19A, an earphone plug 94 includes a left speaker terminal L, a right speaker terminal R, a ground terminal G, and a mic terminal M, a first additional connecting terminal A1, which may additionally perform a first function, a second additional connecting terminal A2, which may additionally perform a second function, and a third additional connecting terminal A3 configured by approximately bisecting each of the connecting surfaces of the right speaker terminal R, the ground terminal and the mic terminal M by an insulator 950.

Figure 19B:
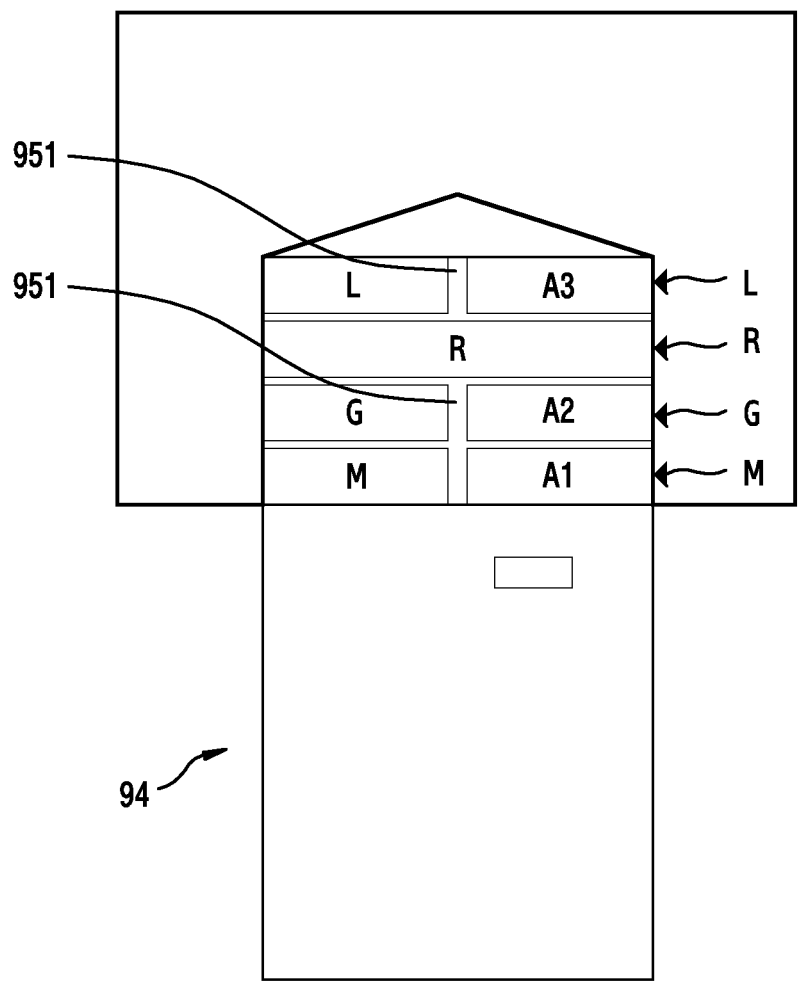

Referring to FIG. 19B, an earphone plug 94 includes a left speaker terminal L, a right speaker terminal R, a ground terminal G, and a mic terminal M, a first additional connecting terminal A1, which may additionally perform a first function, a second additional connecting terminal A2, which may additionally perform a second function, and a third additional connecting terminal A3 configured by approximately bisecting each of the connecting surfaces of the left speaker terminal L, the ground terminal G, and the mic terminal M by insulators 951.

Figure 19C:
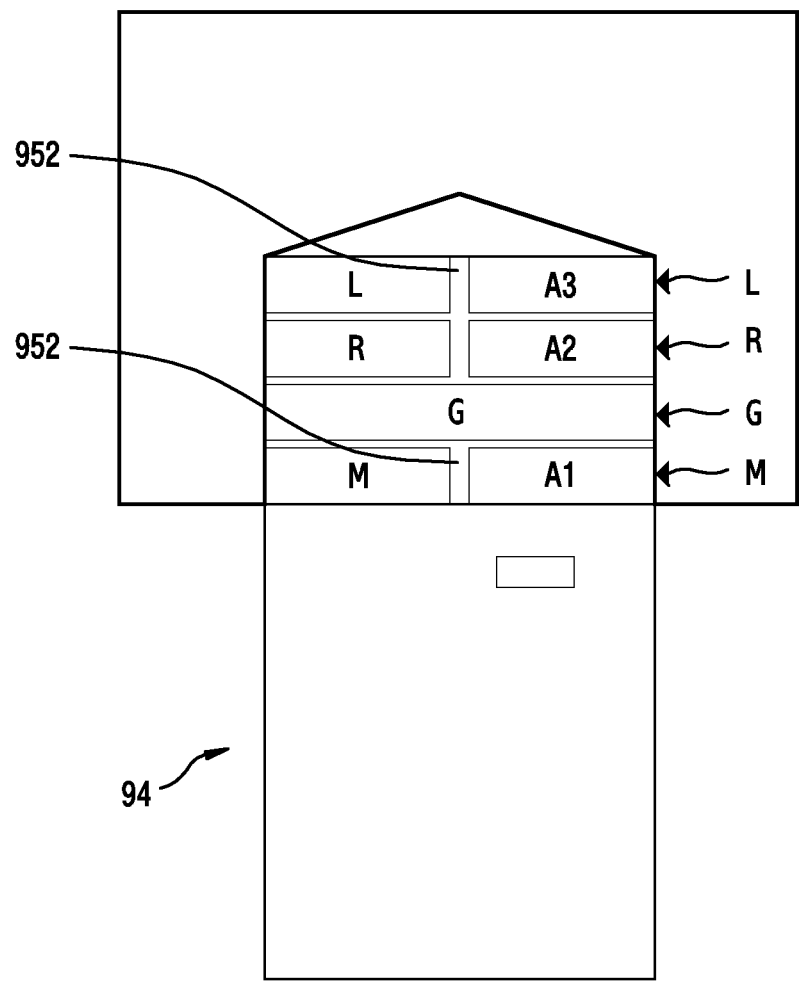

Referring to FIG. 19C, an earphone plug 94 includes a left speaker terminal L, a right speaker terminal R, a ground terminal G, and a terminal M, a first additional connecting terminal A1, which may additionally perform a first function, a second additional connecting terminal A2, which may additionally perform a second function, and a third additional connecting terminal A3 configured by approximately bisecting each of the connecting surfaces of the left speaker terminal L, the right speaker terminal R, and the mic terminal M by insulators 952.

Figure 19D:
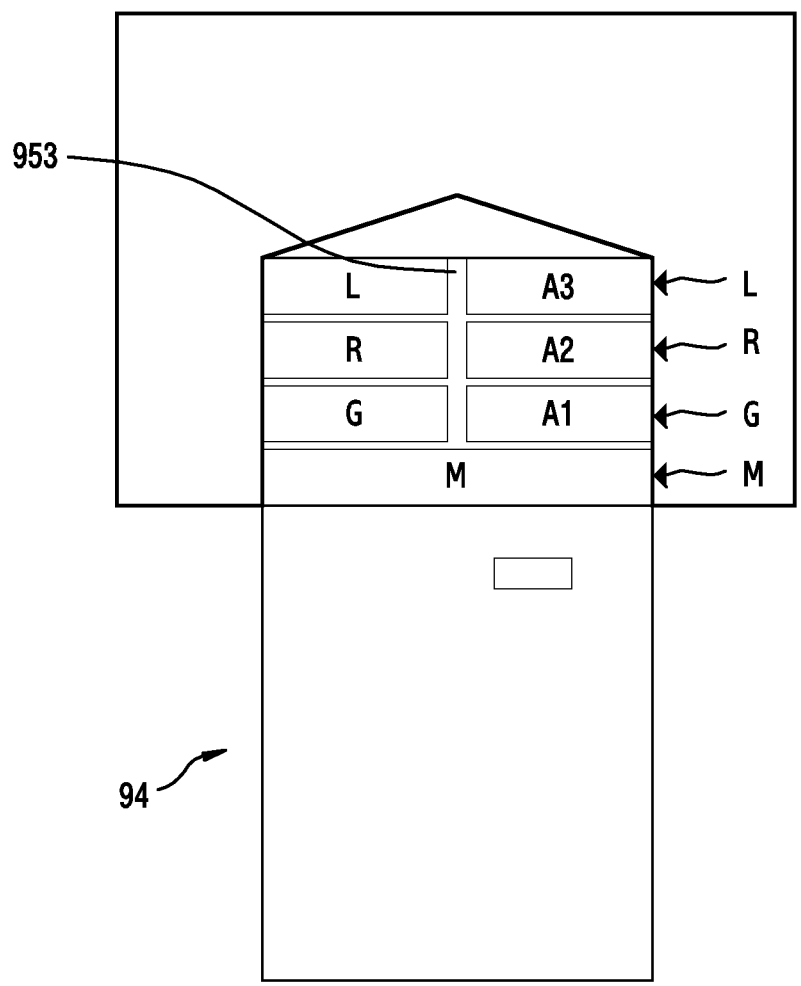

Referring to FIG. 19D, an earphone plug 94 includes a left speaker terminal L, a right speaker terminal R, a ground terminal G, and a mic terminal M, a first additional connecting terminal A1, which may additionally perform a first function, a second additional connecting terminal A2, which may additionally perform a second function, and a third additional connecting terminal A3 configured by approximately bisecting each of the connecting surfaces of the left speaker terminal L, the right speaker terminal R, and the ground terminal G by an insulator 953.

While various embodiments of the present disclosure provide terminal arrangements of an audio connector that enable 4 poles to 8 poles, it shall be noted that one of skill in the art would configure an audio connector having 8 or more poles based on the present disclosure.

According to various embodiments, at least part of the apparatus of the present disclosure may be implemented by using instructions stored in a computer-readable storage medium in the form of a programming module. When the instructions are executed by one or more processors, the one or more processors may perform a function corresponding to the instructions. The computer-readable storage medium may be a memory, for example. At least part of the programming module may be implemented (for example, executed) by using the processor. At least part of the programming module may include a module, a program, a routine, sets of instructions, a process, and the like for performing one or more functions.

Examples of a computer-readable recording medium include magnetic media such as hard disks, floppy disks and magnetic tapes, optical media such as Compact Disc Read Only Memories (CD-ROMs) and Digital Versatile Disc (DVDs), magneto-optical media such as floptical disks, and hardware devices such as Read Only Memories (ROMs), Random Access Memories (RAMs) and flash memories that are especially configured to store and execute program commands (for example, the programming module). Examples of the program commands include machine language codes created by a compiler, and high-level language codes that can be executed by a computer by using an interpreter. The above-described hardware devices may be configured to operate as one or more software modules for performing operations of various embodiments of the present disclosure, and vice versa.

A module or programming module according to various embodiments of the present disclosure may include one or more of the above-described elements, may omit some elements, or may further include additional other elements. The operations performed by the module, the programming module, or the other elements according to various embodiments of the present disclosure may be performed serially, in parallel, repeatedly, or heuristically. In addition, some operation may be performed in different order or may omitted, and an additional operation may be added.

While the invention has been shown and described with reference to certain embodiments thereof, it will be apparent to those skilled in the art that various changes in form and details may be made therein without departing from the spirit and scope of the disclosure, as defined by the appended claims.

What is claimed is:
1. An audio connector comprising:
an earphone plug that includes a plurality of first terminals; and
an earphone connector that includes a plurality of second terminals,
wherein the earphone plug is configured to be inserted into the earphone connector to connect to the earphone connector,
wherein a number of poles of the plurality of first terminals that connect to the plurality of second terminals is variable depending on a movement of the earphone plug,
wherein the earphone plug includes:
a body; and
a connecting portion that moves in a longitudinal direction in the body to adjust the number of poles of the plurality of first terminals that connect to the plurality of second terminals, and
wherein the connecting portion includes:
a non-rotation dependent connecting portion that includes a plurality of first terminals that are arranged in a stacked form; and
a rotation dependent connecting portion that is rotatably connected to the non-rotation dependent connecting portion and includes a plurality of second terminals that are arranged in a stacked form.

2. The audio connector of claim 1, wherein the non-rotation dependent connecting portion is arranged outside the body, and the rotation dependent connecting portion is arranged inside the body.

3. The audio connector of claim 1, wherein the non-rotation dependent connecting portion includes:
at least three of a left speaker terminal (L), a right speaker terminal (R), a ground terminal (G), and a microphone terminal (M), and
at least one of left ANC microphone terminal (ANC_MIC_L) and a right ANC microphone terminal (ANC_MIC_R).

4. The audio connector of claim 3, wherein the earphone connector includes:
at least three of a left speaker terminal (L), a right speaker terminal (R), a ground terminal (G), and a microphone terminal (M); and
at least one of a left ANC microphone terminal (ANC_MIC_L) and a right ANC microphone terminal (ANC_MIC_R).

5. The audio connector of claim 1, wherein the rotation dependent connecting portion is arranged on a half of an outer peripheral surface of the connecting portion, and includes:
at least three of a left speaker terminal (L), a right speaker terminal (R), a ground terminal (G), and a microphone terminal (M); and
at least one of left ANC microphone terminal (ANC_MIC_L) and a right ANC microphone terminal (ANC_MIC_R).

6. The audio connector of claim 5, wherein the earphone connector includes:
at least three of a left speaker terminal (L), a right speaker terminal (R), a ground terminal (G), and a microphone terminal (M); and
at least one of a left ANC microphone terminal (ANC_MIC_L) and a right ANC microphone terminal (ANC_MIC_R).

7. The audio connector of claim 1, wherein rotation of the earphone plug relative to the earphone connector reduces the number of poles of the plurality of first terminals that connect to the plurality of second terminals to three poles or four poles.

8. The audio connector of claim 1, wherein the non-rotation dependent connecting portion and the rotation dependent connecting portion are protected and movably supported by a hollow body.

9. An earphone plug comprising:
a connecting portion that includes a plurality of terminals that are arranged in a stacked form along a longitudinal direction thereof,
wherein the connecting portion is divided by at least one insulator, and
the insulator extends along an outer peripheral surface of the connecting portion in the longitudinal direction, to divide a connecting region of the plurality of terminals,
wherein the connecting portion includes:
at least one external connecting portion; and
a rotatable internal connecting portion insulated from the at least one external connecting portion,
wherein each of the at least one external connecting portion and the rotatable internal connecting portion includes a combination of a conductor and a non-conductor, and
wherein rotation of the rotatable internal connecting portion varies a conductive state between the at least one external connecting portion and the rotatable internal connecting portion.

10. The earphone plug of claim 9, wherein the insulator bisects the connecting region.

11. The earphone plug of claim 9, wherein the insulator is arranged to divide the connecting region of each of the plurality of terminals or at intervals of every two terminals.

12. The earphone plug of claim 9, wherein the insulator divides the connecting region so as to increase the number of available terminals.

13. The earphone plug of claim 9, wherein the connecting portion is connected to a retraction/protrusion device that is mounted on a body of the earphone plug, and
wherein operation of the retraction/protrusion device varies a number of the plurality of terminals that protrude outside the body.

14. The earphone plug of claim 13, wherein at least one of the plurality of terminals of the connecting portion are elastically supported to be accommodated inside the body or positioned outside the body.

15. An earphone plug comprising:
a connecting portion that includes a plurality of terminals that are arranged in a stacked form along a longitudinal direction thereof; and
a body that supports the plurality of terminals,
wherein the connecting portion is configured to be movable in the body in the longitudinal direction to adjust a number of terminal poles that protrude outside the body,
wherein the connecting portion includes:
a non-rotation dependent connecting portion that includes a plurality of first terminals that are arranged in a stacked form; and
a rotation dependent connecting portion that is rotatably connected to the non-rotation dependent connecting portion and includes a plurality of second terminals that are arranged in a stacked form.

16. The earphone plug of claim 15, wherein the
plurality of first terminals are non-rotation dependent and are arranged outside the body; and
the plurality of second terminals are rotation dependent and are arranged inside the body.

17. The earphone plug of claim 16, wherein the plurality of first terminals include:
at least three of a left speaker terminal (L), a right speaker terminal (R), a ground terminal (G), and a microphone terminal (M); and
a left ANC microphone terminal (ANC_MIC_L) and a right ANC microphone terminal (ANC_MIC_R).

* * * * *